US008251823B2

(12) United States Patent  (10) Patent No.: US 8,251,823 B2
Kando et al.  (45) Date of Patent: Aug. 28, 2012

(54) VIDEO GAME PROCESSING APPARATUS, A METHOD AND A COMPUTER PROGRAM PRODUCT FOR PROCESSING A VIDEO GAME

(75) Inventors: Tatsuya Kando, Tokyo (JP); Tomohiro Hasegawa, Tokyo (JP); Takeshi Arakawa, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 1307 days.

(21) Appl. No.: 11/947,367

(22) Filed: Nov. 29, 2007

(65) Prior Publication Data

US 2008/0139310 A1 Jun. 12, 2008

(30) Foreign Application Priority Data

Dec. 7, 2006 (JP) ................................. 2006-330656

(51) Int. Cl.
*A63F 13/00* (2006.01)
(52) U.S. Cl. ........................................... 463/39; 463/42
(58) Field of Classification Search .................... 463/39, 463/42
See application file for complete search history.

(56) References Cited

U.S. PATENT DOCUMENTS

| | | | | |
|---|---|---|---|---|
| 6,280,329 B1 * | 8/2001 | Kondo et al. | ................... | 463/43 |
| 6,306,033 B1 * | 10/2001 | Niwa et al. | ........................ | 463/1 |
| 6,315,669 B1 * | 11/2001 | Okada et al. | .................... | 463/44 |
| 6,322,447 B1 * | 11/2001 | Okada et al. | .................... | 463/31 |
| 6,383,075 B1 * | 5/2002 | Jeong et al. | ..................... | 463/39 |
| 6,508,712 B1 * | 1/2003 | Miyagawa | ..................... | 463/43 |
| 6,515,992 B1 * | 2/2003 | Weston et al. | ................ | 370/394 |
| 6,518,951 B1 * | 2/2003 | Keyson | ......................... | 345/156 |
| 6,567,845 B1 * | 5/2003 | Chatani | ........................ | 709/208 |
| 6,585,597 B2 * | 7/2003 | Finn | ................................ | 463/40 |
| 6,676,524 B1 * | 1/2004 | Botzas | ............................ | 463/43 |
| 6,733,392 B2 * | 5/2004 | Narita | ............................ | 463/43 |
| 6,807,521 B1 | 10/2004 | Kurosawa et al. | | |
| 6,947,761 B2 * | 9/2005 | Hutcheson et al. | ........... | 455/518 |

(Continued)

FOREIGN PATENT DOCUMENTS

EP 1145748 10/2001

(Continued)

OTHER PUBLICATIONS

English language Abstract of JP 2005-319135, dated Nov. 17, 2005.

(Continued)

*Primary Examiner* — Corbett Coburn
*Assistant Examiner* — William H McCullough, Jr.
(74) *Attorney, Agent, or Firm* — Greenblum & Bernstein, P.L.C.

(57) ABSTRACT

Game information delivered from other video game processing apparatus different from a player's own video game processing apparatus is received via radio communication. Conditional read data and unconditional read data are stored in an information storage as the game information received by the information receiver. The conditional read data cannot be read when a specific condition is met, while the unconditional read data can be read unconditionally. It is determined whether or not the specific condition is met during progress of the video game. When the game information indicates the unconditional read data, the unconditional read data are set to readable in the case where the unconditional read data are stored in the information storage. On the other hand, when the game information indicates the conditional read data, the conditional read data are set to readable in the case where it is determined that the specific condition is met.

17 Claims, 11 Drawing Sheets

U.S. PATENT DOCUMENTS

| | | | |
|---|---|---|---|
| 7,118,482 B2 * | 10/2006 | Ishihara et al. | 463/43 |
| 7,225,280 B2 * | 5/2007 | Moran | 710/74 |
| 7,465,231 B2 * | 12/2008 | Lewin et al. | 463/37 |
| 7,559,835 B2 * | 7/2009 | Hasegawa et al. | 463/7 |
| 7,811,171 B2 * | 10/2010 | Mitsuyoshi et al. | 463/39 |
| 8,105,160 B2 * | 1/2012 | Kando et al. | 463/31 |
| 2001/0003714 A1 * | 6/2001 | Takata et al. | 463/40 |
| 2001/0031653 A1 | 10/2001 | Oe et al. | |
| 2002/0098885 A1 * | 7/2002 | Sakaguchi | 463/31 |
| 2003/0027634 A1 * | 2/2003 | Matthews, III | 463/39 |
| 2003/0171147 A1 * | 9/2003 | Sinclair et al. | 463/39 |
| 2004/0029638 A1 * | 2/2004 | Hytcheson et al. | 463/42 |
| 2004/0063498 A1 | 4/2004 | Oakes et al. | |
| 2004/0082383 A1 * | 4/2004 | Muncaster et al. | 463/39 |
| 2004/0087369 A1 * | 5/2004 | Tanaka et al. | 463/42 |
| 2004/0110563 A1 * | 6/2004 | Tanaka et al. | 463/39 |
| 2004/0137975 A1 * | 7/2004 | Yamada et al. | 463/1 |
| 2004/0185881 A1 | 9/2004 | Lee et al. | |
| 2004/0268042 A1 * | 12/2004 | Okada et al. | 711/115 |
| 2005/0197187 A1 * | 9/2005 | Mitsuyoshi et al. | 463/31 |
| 2005/0221897 A1 * | 10/2005 | Oe | 463/42 |
| 2005/0282634 A1 * | 12/2005 | Yamada et al. | 463/39 |
| 2006/0031163 A1 * | 2/2006 | Kivipuro et al. | 705/50 |
| 2006/0034231 A1 * | 2/2006 | Tailor | 370/338 |
| 2006/0079329 A1 * | 4/2006 | Yamada et al. | 463/39 |
| 2006/0089910 A1 * | 4/2006 | Kivipuro et al. | 705/50 |
| 2006/0166739 A1 * | 7/2006 | Lin | 463/39 |
| 2006/0252548 A1 * | 11/2006 | Sasaki et al. | 463/42 |
| 2006/0256091 A1 * | 11/2006 | Hino | 345/173 |
| 2007/0218992 A1 | 9/2007 | Maehiro et al. | |
| 2007/0265046 A1 | 11/2007 | Sato | |
| 2007/0265047 A1 * | 11/2007 | Nomura | 463/8 |
| 2007/0298879 A1 * | 12/2007 | Kobayashi et al. | 463/31 |
| 2008/0139310 A1 * | 6/2008 | Kando et al. | 463/33 |
| 2008/0146333 A1 * | 6/2008 | Kando et al. | 463/31 |
| 2008/0280676 A1 * | 11/2008 | Distanik et al. | 463/29 |
| 2008/0293466 A1 * | 11/2008 | Arakawa et al. | 463/7 |
| 2008/0311994 A1 * | 12/2008 | Amaitis et al. | 463/39 |
| 2009/0124393 A1 * | 5/2009 | Tanaka et al. | 463/42 |
| 2009/0253518 A1 * | 10/2009 | Sasaki et al. | 463/42 |
| 2010/0009755 A1 * | 1/2010 | Burckart et al. | 463/39 |
| 2010/0099498 A1 * | 4/2010 | Yamada et al. | 463/42 |
| 2010/0197404 A1 * | 8/2010 | Lum et al. | 463/39 |
| 2011/0177866 A1 * | 7/2011 | Kim | 463/42 |

FOREIGN PATENT DOCUMENTS

| | | |
|---|---|---|
| EP | 1153636 | 11/2001 |
| JP | 11-300044 | 11/1999 |
| JP | 2000-279633 | 10/2000 |
| JP | 2003-296284 | 10/2003 |
| JP | 2004-078890 | 3/2004 |
| JP | 2004-290306 | 10/2004 |
| JP | 2005-254012 | 9/2005 |
| JP | 2005-296419 | 10/2005 |
| JP | 2005-319135 | 11/2005 |
| JP | 2006-087625 | 4/2006 |

OTHER PUBLICATIONS

U.S. Appl. No. 11/846,924 to Hasegawa et al., filed Aug. 29, 2007.
U.S. Appl. No. 11/946,391 to Kando et al, filed Nov. 28, 2007.
U.S. Appl. No. 11/846,755 to Kando et al, filed Aug. 29, 2007.
English language Abstract of JP 11-300044, dated Nov. 2, 1999.
English language Abstract of JP 2000-279633, dated Oct. 10, 2000.
English language Abstract of JP 2006-087625, dated Apr. 6, 2006.
English language Abstract of JP 2004-290306, dated Oct. 21, 2004.
"Subarashikikonosekai," [online], Sep. 22, 2006, Square Enix Co., Ltd., (searched on Feb. 5, 2008) Internet <URL:http://www.square-enix.co.jp/gs06/titles/subarashiki/>.
"Fighting for One Piece," V Jump Books [Game Series] for PlayStation 2, Shueisha Inc., Japan, Sep. 13, 2005, First Edition, p. 24.
"Mariokart DS: Kanpeki Bakuso Guide Book," Enterbrain Inc., Japan, Jan. 24, 2006, First Edition, p. 25, accompanied by an English language partial translation thereof.
"Gallop Racer 6—Revolution—Saisyu Koryaku Text~Tetsuwan Jockey Yousei Guide~," DigiCube Co., Ltd., Japan, Feb. 3, 2003, First Edition, p. 54, accompanied by an English language partial translation thereof.
"Romancing SaGa—Minstrel Song—," V Jump Books [Game Series] for PlayStation 2, Shueisha Inc., Japan, Apr. 26, 2005, First Edition, p. 29, accompanied by an English language partial translation thereof.
"Tengai Makyo III Namida Official Guide Book," Enterbrain Inc., Japan, Apr. 26, 2005, First Edition, p. 21, accompanied by an English language partial translation thereof.
"PlayStation Bust a Move 2 Dance Tengoku Mix," Shueisha Inc., Japan, May 5, 1999, First Edition, p. 43, accompanied by an English language partial translation thereof.
"Weekly Fami-Tsu, Oct. 8, 2004 (Before Crisis Final Fantasy. VII)" (Enterbrain, Inc., Oct. 8, 2004, vol. 19, No. 41, pp. 208-209), accompanied by an English language partial translation of the same.
"LOGiN, vol. 25, No. 9 (Final Fantasy XI)" (Enterbrain, Inc., Sep. 1, 2006, vol. 25, No. 9, pp. 138-139), accompanied by an English language partial translation of the same.
English language Abstract of JP 2005-296419, dated Oct. 27, 2005.
English language Abstract of JP 2004-078890, dated Mar. 11, 2004.
English language Abstract of JP 2003-296284, dated Oct. 17, 2003.

* cited by examiner

VIDEO GAME PROCESSING APPARATUS, A METHOD AND A COMPUTER PROGRAM PRODUCT FOR PROCESSING A VIDEO GAME

CROSS-REFERENCE TO RELATED APPLICATION

The present disclosure relates to subject matter contained in Japanese Patent Application No. 2006-330656, filed on Dec. 7, 2006, the disclosure of which is expressly incorporated herein by reference in its entirety.

BACKGROUND OF THE INVENTION

1. Field of the Invention

The present invention relates to a technique for controlling progress of a video game by displaying a player character on an image display screen of an image display apparatus, and by controlling an action of the player character displayed on the image display screen in response to operation(s) by a player.

2. Description of the Related Art

Heretofore, various kinds of so-called role playing games (RPG; that is, a game in which a player plays a role of a character in a world of the game to accomplish a predetermined object while enjoying a process that the character grows through various experiences) have been provided.

In such a RPG, generally, a player character acting in response to operations by the player wins a battle against an enemy character thwarting accomplishment of a predetermined object in the RPG, by which various benefits such as an experiential value are supplied to the player character.

Further, recently, in such an RPG, it becomes active to play the RPG game by exchanging game information on the video game, such as a message and an item, between other unspecified players using radio communication or the like.

On playing such type of video game in which game information is exchanged, for example, the following technique is executed as a method of heightening interest of the player in the video game further. Namely, there has been proposed a technique in which when an item is exchanged between a plurality of mobile game apparatuses via a constructed communication network, the items presented from the respective mobile game apparatuses are shuffled, whereby it is not determined in advance that each of the mobile game apparatuses can obtain any item. This technique attempted to heighten interest of the player in the video game (for example, see Japanese Patent Application Publication No. 2005-254012).

Further, there has also been proposed a technique in which the players can in advance confirm an exchangeable item between the mobile game apparatuses, and the item for which a destination to deliver is determined can be obtained surely in the case where a specific action (for example, shuffle of items to be exchanged) is completed (for example, see Japanese Patent Application Publication No. 2005-319135).

However, in the mobile game apparatus disclosed in Japanese Patent Application Publications No. 2005-254012 and No. 2005-319135 described above, in the case where the game information such as an item to be exchanged between the mobile game apparatuses, the game information is configured so as to be able to be obtained surely when it is shuffled or the specific action is completed. Thus, there has been a problem that it is difficult to present further interest in the game play to the players because there is no element to become a large obstacle or difficulty against the player when to obtain the game information.

SUMMARY OF THE INVENTION

It is one object of the present invention to solve the problems described above and to provide a video game processing apparatus, a method and a computer program product for processing a video game by which predetermined game information among the game information obtained with the radio communication between the video game processing apparatuses can be utilized in the case where the specific condition is met, an element to heighten usage difficulty of the game information communicated between the video game processing apparatuses can thereby be added to the video game, and this makes it possible to improve the taste to play the video game.

In order to achieve the above object, an aspect of the present invention is directed to a video game processing apparatus that causes an image display apparatus to display a player character on an image display screen of the image display apparatus. The video game processing apparatus (for example, a video game apparatus main body 10, a video game apparatus 100) controls progress of the video game by controlling an action of the player character to be displayed on the image display screen in accordance with operations by a player. The video game processing apparatus of the present invention includes an information receiver that receives game information delivered from other video game processing apparatus via radio communication, the other video game processing apparatus being different from the player's own video game processing apparatus.

The video game processing apparatus also includes an information storage that stores conditional read data and unconditional read data as the game information received by the information receiver, the conditional read data being not able to be read when a specific condition is met, the unconditional read data being able to be read unconditionally.

The video game processing apparatus also includes an information setter that sets the read data indicated by the game information stored in the information storage to readable.

The video game processing apparatus also includes a condition determiner that determines whether or not the specific condition is met during progress of the video game.

In this case, when the game information indicates the unconditional read data, the information setter sets the unconditional read data to readable in the case where the unconditional read data are stored in the information storage. On the other hand, when the game information indicates the conditional read data, the information setter sets the conditional read data to readable in the case where it is determined that the specific condition is met by the condition determiner.

Since the video game processing apparatus may have a configuration as described above, predetermined game information among the game information obtained with the radio communication between the video game processing apparatuses can be utilized in the case where the specific condition is met. Thus, an element to heighten usage difficulty of the game information communicated between the video game processing apparatuses can be added to the video game, and this makes it possible to improve the taste to play the video game.

It is preferable that the video game processing apparatus further includes a communicational result information memory that stores communicational result information therein, the communicational result information including apparatus identification information and a radio communication time period with the other video game processing apparatus, the apparatus identification information being capable of specifying the other video game processing apparatus that delivered the received game information. Since the video game processing apparatus may have a configuration as described above, it is possible to specify the video game processing apparatus that delivered the game information. In addition, by actively utilizing the communication result information stored with the communication with the specified video game processing apparatus, predetermined game information can be utilized in the case where the specific condition is met. Thus, an element to heighten the usage difficulty of the game information between the video game processing apparatuses can be added to the video game, and this makes it possible to improve the taste to play the video game.

It is preferable that the video game processing apparatus further includes a status information updater that updates status information of the player character in accordance with the number of pieces of the communicational result information stored in the communicational result information memory. Since the video game processing apparatus may have a configuration as described above, it is possible to actively utilize the communication result information in the video game. Thus, it is possible to improve the taste to play the video game while heightening the usage difficulty of the game information communicated between video game processing apparatuses.

It is preferable that the game information includes the read data and status instruction data for executing a setup instruction of predetermined status contents. In this case, the video game processing apparatus further includes a status information updater that updates status information of the player character in accordance with the status instruction data so as to become the predetermined status contents. Since the video game processing apparatus may have a configuration as described above, it is possible to influence on the character status contents of the player character on the basis of the game information communicated between the video game processing apparatuses. Therefore, it is possible to improve the taste to play the video game while heightening the usage difficulty of the game information communicated between video game processing apparatuses.

It is preferable that the read data indicated by the game information are background data indicating a background to be displayed on the image display screen of the image display apparatus. Since the video game processing apparatus may have a configuration as described above, it is possible to influence on the background data of the game screen on the basis of the game information communicated between the video game processing apparatuses. Therefore, it is possible to improve the taste to play the video game while heightening the usage difficulty of the game information communicated between video game processing apparatuses.

It is preferable that the information setter sets the read data indicated by the game information so as to readable on an arbitrary screen. Since the video game processing apparatus may have a configuration as described above, it is possible to influence on various screens of the game screen on the basis of the game information communicated between the video game processing apparatuses. Thus, it is possible to improve the taste to play the video game while heightening the usage difficulty of the game information communicated between video game processing apparatuses.

It is preferable that the condition determiner determines that the specific condition is met in the case where the arbitrary screen in which the read data indicated by the conditional read data are set to readable is displayed on the image display screen of the image display apparatus. Since the video game processing apparatus may have a configuration as described above, the arbitrary screen can influence on the video game on the basis of the game information communicated between the video game processing apparatuses. Thus, it is possible to improve the taste to play the video game while heightening the usage difficulty of the game information communicated between video game processing apparatuses.

Further, according to another aspect of the present invention, the present invention is directed to a method of processing a video game by causing an image display apparatus to display a player character of the video game on an image display screen of the image display apparatus. In this case, the method controls progress of the video game by controlling an action of the player character to be displayed on the image display screen in accordance with an operation by a player. The method of the present invention includes receiving game information delivered from other video game processing apparatus via radio communication, the other video game processing apparatus being different from a player's own video game processing apparatus.

The method also includes storing conditional read data and unconditional read data as the received game information, the conditional read data being not able to be read when a specific condition is met, the unconditional read data being able to be read unconditionally.

The method also includes setting the read data indicated by the stored game information to readable.

The method also includes determining whether or not the specific condition is met during progress of the video game.

In this case, in the setting the read data, when the game information indicates the unconditional read data, the unconditional read data are set to readable in the case where the unconditional read data are stored. On the other hand, when the game information indicates the conditional read data, the conditional read data are set to readable in the case where it is determined that the specific condition is met.

Moreover, according to still another aspect of the present invention, the present invention is directed to a computer program product for processing a video game. In this case, progress of the video game is controlled by causing an image display apparatus to display a player character of the video game on an image display screen of the image display apparatus, and controlling an action of the player character to be displayed on the image display screen in accordance with an operation by a player. The computer program product of the present invention causes a computer (for example, the video game apparatus 100, including the video game apparatus main body 10) to execute steps including receiving game information delivered from other video game processing apparatus via radio communication, the other video game processing apparatus being different from a player's own video game processing apparatus.

The steps also include storing conditional read data and unconditional read data as the received game information, the conditional read data being not able to be read when a specific condition is met, the unconditional read data being able to be read unconditionally.

The steps also include setting the read data indicated by the stored game information to readable.

The steps also include determining whether or not the specific condition is met during progress of the video game.

In this case, in the setting the read data, when the game information indicates the unconditional read data, the unconditional read data are set to readable in the case where the unconditional read data are stored. On the other hand, when the game information indicates the conditional read data, the conditional read data are set to readable in the case where it is determined that the specific condition is met.

According to the present invention, predetermined game information among the game information obtained with the radio communication between the video game processing apparatuses can be utilized in the case where the specific condition is met. Thus, an element to heighten usage difficulty of the game information communicated between the video game processing apparatuses can be added to the video game, and this makes it possible to improve the taste to play the video game.

BRIEF DESCRIPTION OF THE DRAWINGS

The foregoing and other objects, features and advantages of the present invention will become more readily apparent from the following detailed description of preferred embodiments of the present invention that proceeds with reference to the appending drawings.

DETAILED DESCRIPTION OF THE INVENTION

Preferred embodiments of a video game processing apparatus, a method and a computer program product for processing a video game according to the present invention will now be described in detail with reference to the appending drawings.

Figure 1:
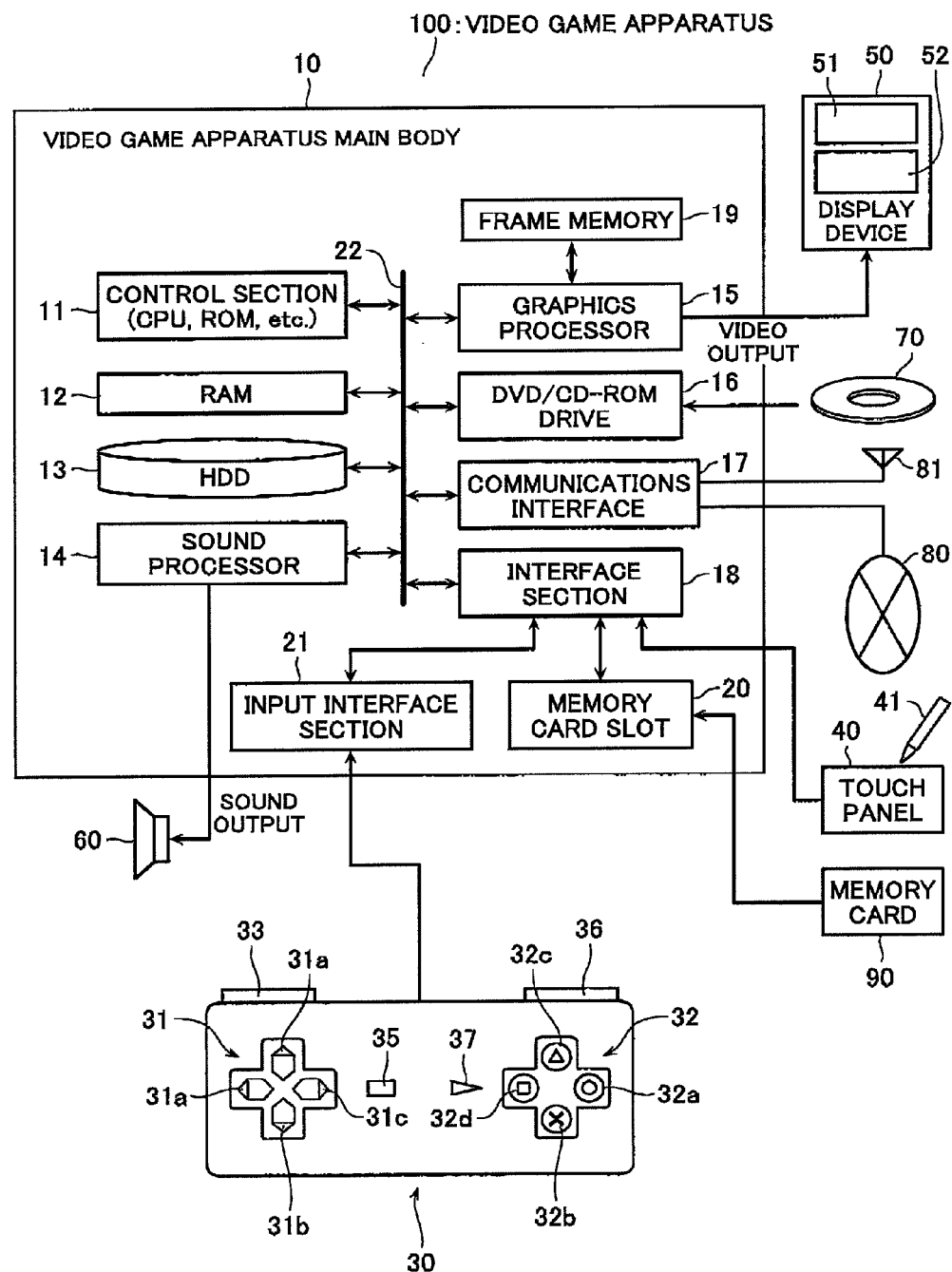
FIG. 1 is a block diagram that illustrates an example of a configuration of a video game apparatus to which an embodiment of the present invention is applied.

FIG. 1 is a block diagram that illustrates a configuration of a video game apparatus 100 to which an embodiment of the present invention is applied. However, those skilled in the art will readily recognize that other devices may be used without departing from the spirit or scope of the present invention.

As shown in FIG. 1, a video game apparatus 100 of the present embodiment includes a video game apparatus main body 10, a display device 50, and a sound output device 60. The video game apparatus main body 10 is constituted from a video game system or a mobile game device that is put on the market, for example. Further, the display device 50 is constituted from, for example, a television apparatus, a liquid crystal display device, a micro-mirror device, a holographic display device, or any combination thereof. The display device 50 is provided with a plurality of image display screens including an upper image display screen 51 and a lower image display screen 52. However, those skilled in the art will readily recognize that any device capable of generating or reproducing an image may be used without departing from the scope or spirit of the present invention.

The video game apparatus main body 10 includes a control section 11, a RAM (Random Access Memory) 12, a HDD (hard disk drive) 13, a sound processor 14, a graphics processor 15, a DVD/CD-ROM drive 16, a communications interface 17, an interface section 18, a frame memory 19, a memory card slot 20, and an input interface section 21.

In the video game apparatus main body 10, each of the control section 11, the RAM (Random Access Memory) 12, the HDD (Hard Disk Drive) 13, the sound processor 14, the graphics processor 15, the DVD/CD-ROM drive 16, the communications interface 17 and the interface section 18 is connected to an internal bus 22.

The control section 11 includes a CPU (Central Processing Unit), ROM (Read Only Memory) and the like. The control section 11 executes control processes of the whole video game apparatus 100 in accordance with control programs stored in the HDD 13 and/or a storage medium 70. The control section 11 includes an internal timer used to generate a timer interruption, for example. The RAM 12 is mainly used as a work area for the control section 11. The HDD 13 is a storage area in the video game apparatus main body 10 for storing the control programs and various data.

The sound processor 14 has a function of an audio input/output interface for carrying out D/A conversion and A/D conversion of a sound signal (or audio signal). The sound processor 14 is connected to a sound output device 60, which includes a speaker, for example, but may include any other device capable of generating or reproducing an audible signal. The sound processor 14 outputs a sound signal to the sound output device 60 in accordance with a sound outputting command from the control section 11 that executes a process according to the various control programs.

Further, the sound processor 14 is also connected to a sound input device (not shown in the drawings) constituted from a microphone, for example. A sound signal from the sound input device is inputted into the sound processor 14 in accordance with a sound input command from the control section 11. In this regard, the sound output device 60 may be embedded in the display device 50 or the video game apparatus main body 10, or may be affixed to a vibrating surface that may be caused to generate the audible signal.

The graphics processor 15 is connected to the display device 50 including, for example, the upper image display screen 51 and the lower image display screen 52 on each of which an image is displayed. However, those skilled in the art will readily recognize that the graphics processor may be coupled to other known types of display devices, such as a head-mounted display, a holographic three-dimensional display or the like, without departing from the spirit or scope of the present invention. The graphics processor 15 develops an image on the frame memory 19 in accordance with a drawing or graphics command from the control section 11, and outputs video signals for displaying the image on the upper and lower image display screens 51, 52 to the display device 50. A switching time for images to be displayed according to the video signals is set to 1/30 seconds per frame (for NTSC type displays), for example. However, the switching time may be any other frame rate (for example, 1/25 second per frame (for PAL type displays)) as those skilled in the art will appreciate without departing from the spirit or scope of the present invention.

A storage medium 70 such as a DVD-ROM medium or a CD-ROM medium, or equivalent, in which control programs for a video game are stored is mounted in the DVD/CD-ROM drive 16. The DVD/CD-ROM drive 16 executes a process for reading out various data such as control programs from the storage medium 70.

The storage medium 70 may be, other than the DVD-ROM or the CD-ROM described above, various types of DVD (such as DVD-RAM, DVD-R, DVD-RW, DVD+R, DVD+RW, DVD+RDL, DVD-RDL, Blue-Ray Disc, or HD-DVD) or various types of CD (such as CD-R or CD-RW). In this case, in place of or in addition to the DVD/CD-ROM drive 16, the video game apparatus main body 10 may be provided with a drive for executing processes to read out and/or write various kinds of data from and/or into the storage medium 70.

The communications interface 17 is connected to a communication network 80 such as the Internet, a local area network (LAN), a wide area network (WAN), or the like, in a wireless or wired manner. Further, the communications interface 17 is connected to other video game apparatus main bodies 10 via a communication unit (not shown in the drawings) having an antenna 81 in a wireless manner. The video game apparatus main body 10 carries out communication with, for example, another computer via the communication network 80 using a communication function of the communications interface 17. The video game apparatus main body 10 also carries out wireless communication with, for example, other video game apparatus main bodies 10 using the antenna 81. Thus, the video game apparatus main body 10 has a function as a communication terminal.

Each of the input interface section 21, the memory card slot 20 and a touch panel 40 as an operation input section (or controller) is connected to the interface section 18. The interface section 18 causes instruction data from the input interface section 21 and instruction data from the touch panel 40 to be stored in the RAM 12 on the basis of operation(s) of a controller device such as a keypad 30 and operation (s) of the touch panel 40 using a touch pen 41 by a player of the video game apparatus 100. In response to the instruction data stored in the RAM 12, the control section 11 executes various arithmetic processing.

In this regard, the touch panel 40 may be used so as to be laminated on at least one of the upper and lower image display screens 51, 52, for example. In this case, the control section 11 recognizes (or senses) input information in accordance with operational inputs by operation(s) for inputs from the player by managing and controlling display timing on at least one of the upper and lower image display screens 51, 52 on which the touch panel 40 is laminated, operation timing to the touch panel 40 using the touch pen 41 or the like, and the position coordinates of the touch panel 40 with which the touch pen 41 is in contact.

By laminating the touch panel 40 on at least one of the upper and lower image display screens 51, 52 in this manner, the player is allowed to input much information along with the keypad 30 without making the controller device (including the keypad 30) of the player bigger. Here, as the type of the touch panel 40, various types of conventional touch panels such as a resistive touch panel and a pressure-sensitive touch panel can be utilized. In this regard, the display device 50 may not include a plurality of image display screens such as upper and lower image display screens 51, 52, but may includes only one image display screen.

The video game apparatus main body 10 constructed in this manner is connected to the touch panel 40 via the interface section 18 as described above. The video game apparatus main body 10 is also connected to the controller device such as the keypad 30 as an operation input section (controller) via the input interface section 21. However, other types of controllers may be used without departing from the scope or spirit of the present invention. In this regard, the keypad 30 may be integrated with the video game apparatus main body 10, or may be provided as a separate component.

As shown in FIG. 1, for example, a cross key 31, and a group of buttons 32 are arranged on the upper portion of the front surface of the keypad 30. The cross key 31 includes an upper key 31a, a lower key 31b, a right key 31c and a left key 31d. The group of buttons 32 includes a circle button 32a, an X key 32b, a triangle key 32c and a square key 32d. Further, a select button 35 and a start button 37 are arranged at a connecting portion between a base on which the cross key 31 is arranged and a base on which the group of buttons 32 are arranged. In addition, multiple buttons such as an R1 button 36 and an L1 button 33 are arranged at the side surface of the keypad 30. Otherwise, although the drawing is omitted, a joystick or the like may be provided in the keypad 30.

The keypad 30 constituted in this manner is provided with multiple switches respectively connected to the cross key 31, the circle button 32a, the X button 32b, the triangle button 32c, the square button 32d, the select button 35, the start button 37, the R1 button 36 and the L1 button 33. When pressing force is applied to any button, the corresponding switch is turned on. A detected signal in accordance with on/off of the switch is generated in the keypad 30. Further, in the case where the joystick is provided, a detected signal is generated in accordance with an inclined direction of the joystick in the keypad 30.

The switching type of detected signal generated in the keypad 30 is outputted to the control section 11 via the input interface section 21 (through wired or wireless connection), by which detected information indicating that any button on the keypad 30 is pressed is generated. Further, in the case where the joystick is provided, the joystick type of detected signal becomes detected information indicating the state of the joystick. In this way, operation instruction(s) (that is, operational inputs) by a user (player) using the keypad 30, for example, is supplied to the video game apparatus main body 10 (that is, the control section 11).

Further, the interface section 18 executes, according to the command(s) from the control section 11, a process to store data indicative of the progress of the video game stored in the RAM 12 into the memory card 90 installed in the memory card slot 20. The interface section 18 also executes processes to read out data on the video game stored in the memory card 90 at the time of suspending the video game and to transfer such data to the RAM 12, and the like.

Various data, such as control program data for performing the video game with the video game apparatus 100, are stored in the storage medium 70, for example. The various data, such as the control program data stored in the storage medium 70, are read out by the DVD/CD-ROM drive 16 in which the storage medium 70 is installed. The data thus read out are loaded onto the RAM 12.

The control section 11 executes, in accordance with the control program loaded on the RAM 12, various processes such as a process to output the drawing or graphics command to the graphics processor 15, and a process to output the sound outputting command to the sound processor 14. In this regard, the interim data generated in response to the progress of the video game (for example, data indicative of scoring of the video game, the state of a player character and the like) are stored in the RAM 12 used as a work memory while the control section 11 executes processing.

It is assumed that a three-dimensional video game according to an aspect of the present embodiment is a video game wherein multiple characters, including a player character (that is, PC: a character that moves in accordance with the operation of the keypad 30 and/or the touch panel 40 by the player), move on a field provided in a virtual three-dimensional space displayed on the upper and lower image display screens 51, 52, by which the video game proceeds. In this regard, it is assumed that the virtual three-dimensional space in which the field is formed is indicated by coordinates of the world coordinate system. Further, the field is defined by multiple surfaces, and coordinates of vertexes of the respective constituent surfaces are shown as characteristic points.

Next, an operation of the video game apparatus 100 according to an aspect of the present embodiment will now be described.

Here, in order to simplify the explanation of the operation of the video game apparatus 100, it is assumed that at least one player character PC and multiple non-player characters (which are moved in accordance with control processes of the video game apparatus 100 (more specifically, control processes of the control section 11), and hereinafter, referred to simply as "NPC") exist as objects that are movable in the virtual three-dimensional space. However, the explanations for any process other than the processes relating to the present invention are omitted, in particular. In this regard, in the present embodiment, video game control and communication for a RPG is executed, but those skilled in the art will recognize and appreciate that changes to the present invention can be made without departing from the scope or spirit of the present invention.

Figure 2:
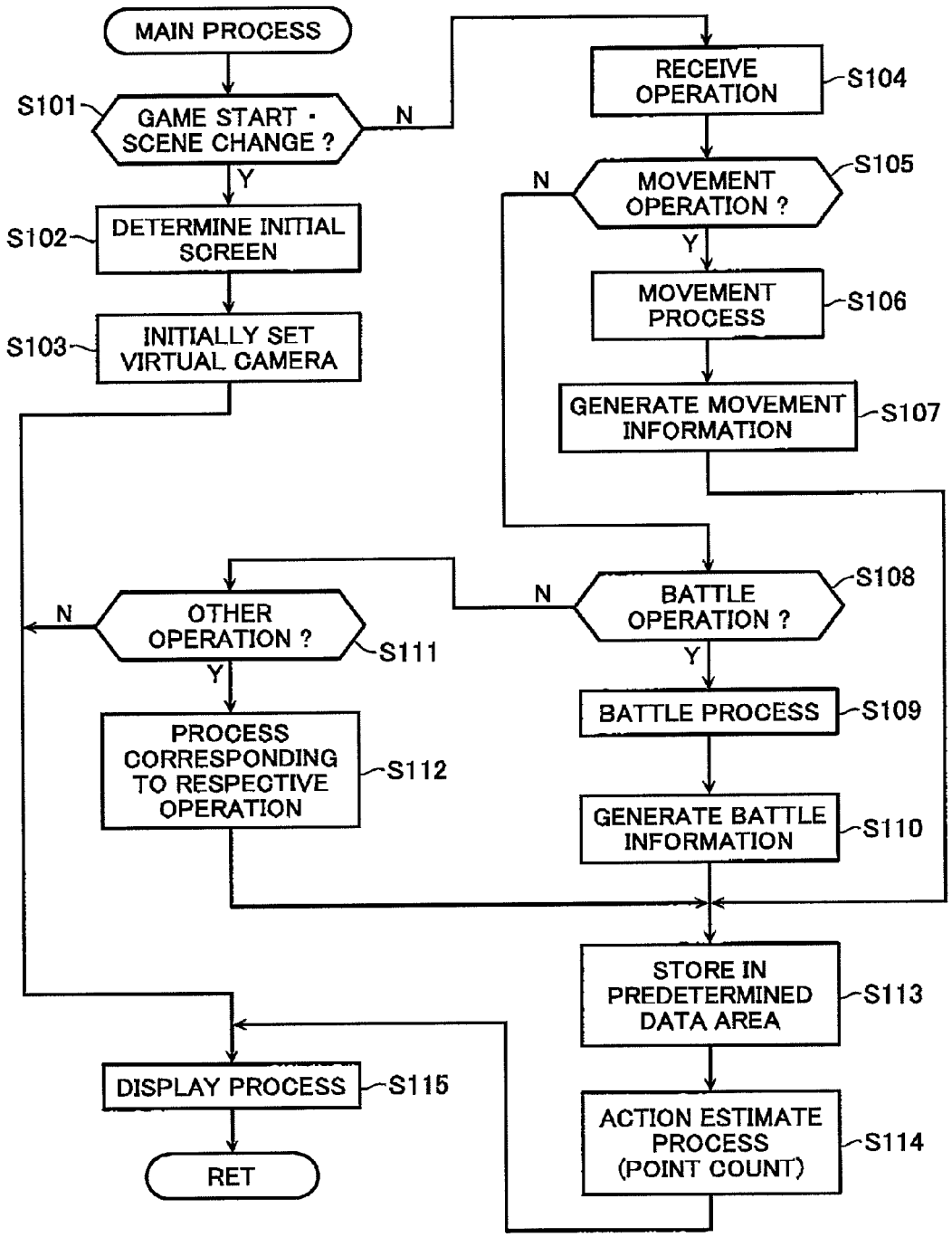
FIG. 2 is a flowchart that illustrates an example of a main process.

FIG. 2 is a flowchart that illustrates an example of a main process of the video game apparatus 100 according to the present embodiment. The main process is, for example, a process for generating an image for one frame and a process required for the control of the video game. The process is executed in accordance with a timer interruption at every ⅓₀ second. However, it is to be noted that timing of "at every ⅓₀ second" is only one example, as mentioned above. Instead, for example, the main process may be executed in accordance with a timer interruption at every single field period (every ⅙₀ second) or at every two frame periods (every ¹⁄₁₅ second), or any other appropriate field rate that may be recognized by those skilled in the art to be appropriate without departing from the scope or spirit of the present invention.

In the present embodiment, a video game (that is, a RPG game) proceeds in a common field (that is, a single field where a battle field and a movement field are not distinguished from each other) in which various actions (such as a battle action and/or a movement action), including the movement of the player character PC and a battle by the player character PC, are allowed. In the case where a predetermined object in the field is accomplished, one stage may be terminated and the processing may proceed to another stage executed in a next field.

Further, in the present embodiment, a same time base is applied to the respective characters existing in such a field for a battle scene. Once a NPC enters the stage in the field such as a battle scene, the NPC moves on the field or stands still on the field in accordance with the same time base until a hit point (which is a value indicating life force, and hereinafter, referred to simply as "HP" (life point)) thereof becomes zero. In the case where the HP of the player character PC becomes zero in a battle scene in which one player character PC exists, the player character PC becomes a battle impossible state. Then, the video game is terminated, or other event occurs.

However, in the present embodiment, for example, in the case where a plurality of player characters PCs enter the stage in the field, all of the plurality of player characters PC do not become a battle impossible state so long as the HPs of all of the plurality of player characters PC become zero. Namely, for example, in the case where the HP of one player character PC still remains even when the HP of the other player character PC becomes zero, the respective player characters, including the other player character PC whose HP becomes zero, can keep (or maintain) the battle states. In this case, a portion displayed on each of the upper and lower image display screens 51, 52 as a character image is a portion that exists within the field of view of a virtual camera in the field.

In the main process, the control section 11 determines whether an instruction to start a video game is generated through an operation of the keypad 30 and/or the touch panel 40, via manipulation of the controller 30 by the player or not in the case where the state is still before the video game start. Alternatively, once the video game has started or is in progress, the control section 11 determines whether a timing state is reached to change the scene (for example, change the field) or not in the case where the state is during execution of the video game (Step S101).

In this regard, the word "game start" means a start of the video game by selecting a selection menu such as a "game start" or a "demonstration" when the selection menu is presented on the upper or lower image display screen 51, 52. Thus, at least two opening movies are prepared, which include one when it is reproduced before starting the video game (that is, when it is automatically reproduced by means of power activation) and another when it is reproduced after starting the video game (that is, when it is reproduced in the case where there is an instruction to start the video game from the player).

The timing state to change the scene which is determined at Step S101 is, for example, the time at which a virtual three-dimensional space illustrating a new scene is displayed on the respective upper and lower image display screens 51, 52 in order to finish the scene that has been displayed on the respective upper and lower image display screens 51, 52 until that point (for example, a scene displayed by means of a virtual three-dimensional space, and a scene displayed by means of a directorial moving image) and to switch the displayed scene to the new scene.

In the case where it is determined that an instruction to start a video game is generated or that the timing state reaches a state to change the scene ("Yes" at Step S101), the control section 11 determines an initial screen (an initial screen shown at the time of a start of the video game, or an initial screen shown at the time of a change in the scene) in accordance with the control program (Step S102).

In this case, the initial screen at the game start means a screen to be initially displayed on the upper and lower image display screens 51, 52 when there is an instruction to start the video game from the player, for example. Further, the initial screen at the change in the scene means a screen to be initially displayed at a new stage when the player character clears a stage and the video game thereby proceed to the next stage (that is, at timing when to change the scene), for example.

In the video game apparatus 100 of the present embodiment, various data, such as image data used for the video game and characters or icons, are stored in the storage medium 70 described above. At Step S102, an initial display position of the player character PC in an initial screen or a scene after a scene change (for example, a new stage in the RPG), a non-player character NPC or non-player characters NPCs to be displayed, an initial display position of each of the non-player characters NPCs to be displayed, an icon or icons to be displayed, an initial display position of each of the icons to be displayed and the like are determined in accordance with the control program.

Subsequently, the control section 11 determines a viewpoint position of a virtual camera, a direction of a visual axis, and a size of a visual angle in accordance with the control program. The control section 11 then executes an initial setup for the virtual camera to execute a perspective transformation (step S103). Then, the processing flow proceeds to Step S115 (will be described later).

On the other hand, in the case where it is determined that the video game is executed, and it is not time to change the scene ("No" at Step S101), the control section 11 receives instruction data in accordance with the operation of the keypad 30 and/or the touch panel 40 by the player (Step S104). Namely, the control section 11 determines whether or not instruction data for executing movement of the player character PC or the like are inputted from the keypad 30 and/or the touch panel 40 via the input interface section 21. In the case where effective instruction data (that is, it means that such effective instruction data are instruction data that is allowed to be received by the control section 11) are inputted, the control section 11 receives the effective instruction data.

In the present embodiment, for example, the video game apparatus 100 is in advance constructed so that the player character PC displayed on the upper image display screen 51 can be operated by means of the key pad 30, while the player character PC displayed on the lower image display screen 52 can be operated by means of the touch panel 40. Further, the player character PC displayed on the upper image display screen 51 is set so as not to be allowed to move, and the processes at Steps S105 to S107 are applied only to the player character PC displayed on the lower image display screen 52.

In this regard, in the present embodiment, the player characters PCs that can respectively be operated by means of the keypad 30 and the touch panel 40 may be switched to each other. The player characters PCs that can be operated may be set to be different from each other in accordance with each of the cross key 31 and the group of buttons 32 of the keypad 30 or each of detection regions in the case where the touch panel 40 are divided into the plurality of detection regions.

In the case where the control section 11 receives instruction data for instructing an action of the player character PC relating to the movement of the player character PC (that is, movement instruction data: selection of a movement instruction by a movement command to the touch panel 40 by the touch pen 41 or movement instruction to the player character PC displayed on the lower image display screen 52 (that is, on the touch panel 40) by means of the touch pen 41) in accordance with the operation of the touch panel 40 relating to the movement of the player character (movement operation) at Step S104 ("Yes" at Step S105), the control section 11 executes a movement process in accordance with the movement instruction data thus received (Step S106).

In the movement process at Step S106, the control section 11 causes the position of the player character PC to be moved in a virtual space (on the present field) in accordance with the received movement instruction data. In this regard, such a movement command may include a dash instruction command, for example. The dash instruction command is a command to move the player character PC quickly, and a command for supplying an instruction that the player character PC moves from a predetermined region of a battle area toward other region quickly if the player character PC is in a melee, for example.

Subsequently, the control section 11 generates movement information on the basis of the position information of the player character PC derived along with the movement process (Step S107). Namely, in accordance with the movement of the position of the player character PC by means of the movement process, the control section 11 updates necessary data among data on the viewpoint position of the virtual camera, data on the direction of a visual axis, data on the size of a visual angle, and the like. The control section 11 then changes the setting content of the virtual camera.

The movement information generated at Step S107 includes various kinds of information on the movement such as the position of the player character PC after the movement, the viewpoint position of the virtual camera, the direction of the visual axis, and the size of the visual angle changed along with the movement of the player character PC as well as the information on the movement of the player character PC. Then, the processing flow proceeds to Step S113.

In the case where the control section 11 receives instruction data for instructing an action for the player character PC relating to a battle (that is, battle instruction data: a battle command) in accordance with the operation of the keypad 30 and/or the touch panel 40 by the player for instructing the action of the player character relating to a battle (a battle operation) at Step S104 ("Yes" at Step S108), the control section 11 executes a battle process in accordance with the received battle instruction data (Step S109).

More specifically, in the video game apparatus 100 of the present embodiment, in the case where the operational inputs to instruct the player character PC to execute an action for a battle is carried out by input operations using the cross key 31 and/or the group of buttons 32 of the keypad 30 or input operations using the touch pen 41 to the touch panel 40, the control section 11 determines that the instruction data is received ("Yes" at Step S108), and then executes the battle process (Step S109). In the battle process executed at Step S109, the control section 11 executes, for example, a process to determine a battle result and/or battle development between an enemy character (that is, a non-player character to battle against) and the player character PC, and the like.

Subsequently, the control section 11 generates battle information on the basis of the battle result and/or battle development determined by means of the battle process (Step S110). Namely, in accordance with the battle result and/or battle development by the battle process, the control section 11 updates and sets necessary information. The set information may include, for example, the name of the player character PC that battles an enemy character in the battle process, the name of the enemy character, battle development information, battle result information, a parameter (or parameters) that defines the ability (or abilities) of the player character PC, and the like. The battle information includes various kinds of information on the battle, such as the name of the player character PC that battles the enemy character, the name of the enemy character, battle development, battle result thereof, and a parameter that defines the ability of the player character PC. Then, the processing flow proceeds to Step S113 (will be described later).

In the case where the control section 11 receives instruction data for other instructions (that is, other instruction data: an other command) in accordance with the operation of the keypad 30 and/or the touch panel 40 for executing other instruction (other operation) at Step S104 ("No" at Step S105, "No" at Step 3108, and "Yes" at Step S111), the control section 11 executes a process (for example, a conversation between characters, a purchase action, a pick up action, a movement action of an item and the like) in accordance with the other instruction data thus received (Step S112). The other information corresponding to the process result at Step S112 is then generated, and the processing flow proceeds to Step S113.

The control section 11 updates the current position of the player character PC by storing the movement information generated at Step S107 in a predetermined data area of the RAM 12 at Step S113. Further, the control section 11 memorizes and stores various action histories of the player character PC by storing the battle information generated at Step S110 and the other information generated after Step S112 in a predetermined data area of the RAM 12 at Step S113.

Subsequently, the control section 11 executes an action estimate process on the basis of the information indicating the action histories of the player character PC once stored in the RAM 12 (Step S114). More specifically, information required to be digitized is digitized using conversion tables prepared in advance. Further, with respect to information required to be weighted, a score is calculated by multiplying the digitized value by a predetermined coefficient and summing these multiplied digitized values. The calculated score is added to a previous score stored in a predetermined data area of the RAM 12, and the added score is again stored in the predetermined data area. In this way, the score is updated as estimate information.

Then, the control section 11 perspectively transforms the virtual three-dimensional space including the player character PC and the non-player characters NPCs to be displayed from the virtual camera onto the virtual screen in accordance with the setting contents of the virtual camera and the like. The control section 11 then executes a display process to generate a two-dimensional image to be displayed on the upper and lower image display screens 51, 52 (Step S115).

When the display process is terminated, this main process is also terminated. Then, when a timer interruption is generated at the time of a start of a next frame period, a next main process is executed (that is, the main process is repeated). By repeatedly executing the main process, a character image is switched or shifted every frame period, and a moving image (animation) is resultantly displayed on the upper and lower image display screens 51, 52.

Now, the display process at Step S115 will be briefly described. At Step S115, the control section 11 first transforms at least the coordinates of the vertexes of respective polygons included within a range to be perspectively transformed on the virtual screen among the coordinates of the vertexes of polygons constituting the virtual three-dimensional space, in which the player character PC and the three-dimensional non-player characters NPCs are included, from the coordinates of the world coordinate system to the coordinates of the viewpoint coordinate system.

Subsequently, the control section 11 transmits the coordinates of the vertexes of the polygons of the player character PC and the non-player characters NPCs in the viewpoint coordinate system to the graphics processor 15, thereby outputting a drawing or graphics command to the graphics processor 15.

When the drawing or graphics command is inputted to the graphics processor 15, the graphics processor 15 updates, on the basis of the coordinates of the viewpoint coordinate system, the content of the Z buffer so that data on the points that reside at the front side are retained with respect to each of points constituting respective surfaces. When the content of the Z buffer is updated, the graphics processor 15 develops image data on the points that reside at the front side on the frame memory 19. Moreover, the graphics processor 15 executes some processes such as a shading process and a texture mapping process with respect to the developed image data.

Then, the graphics processor 15 in turn reads out the image data developed on the frame memory 19, and generates video signals by adding a sync signal to the image data to output the video signals to the display device 50. The display device 50 displays an image corresponding to the video signals outputted from the graphics processor 15 on the upper and lower image display screens 51, 52. By switching images displayed on the upper and lower image display screens 51, 52 every single frame period, the player can see images including the state where the player character PC and/or the non-player characters NFCs are moved on the field and perceive the images as moving images.

In the video game apparatus 100 of the present embodiment, in conjunction with the processes corresponding to other operations at Step S111 to S112 described above, for example, in the case where communication by close-range radio communication (for example, go-by (surechigai) Communication®) is executed between a video game apparatus main body 10 that one player uses and other video game apparatus main body existing within a predetermined neighboring range that another player uses, obtained game information is stored and the corresponding player can utilize it to play the video game by set the stored game information to be readable unconditionally in accordance with the kind thereof or be readable when a specific condition is met, or by utilizing communication result information indicating a communication result. In the close-range radio communication, the relationship between a host apparatus and an extension apparatus is automatically switched to search a communication partner; a connection therebetween is automatically established when a communication partner is found out, and the connection is cut off after data (information) are exchanged. For this reason, a new game element is achieved in which it is possible to improve the taste to play the video game while adding an element for heightening usage difficulty of game information communicated between video game apparatus main bodies, and this makes it possible to improve interest of the player in the video game.

More specifically, in the video game apparatus 100 of the present embodiment, the following configuration is adopted. For example, when the video game apparatus main body as a communication partner is found out within the predetermined neighboring range from the video game apparatus main body 10, and a communication process is executed, it is determined, for example, "whether the found-out video game apparatus is the same type of terminal or not", "whether the found-out video game apparatus has the same kind of software or not", "whether the found-out video game apparatus is a terminal that executed communication within a predetermined time period or not" and the like by referring to a terminal classification ID indicating a class of the terminal, a terminal identification ID for identifying the terminal, a software identification ID for identifying software that the terminal has, a time stamp and the like. Exchangeable information such as items that can be exchanged as the game information is then exchanged between the apparatuses in accordance with a determination result, or communication history information is utilized, whereby the player can convert these kinds of information to usable information that can be used for software of the video game to utilize it.

Further, in the video game apparatus 100 of the present embodiment, the following configuration is adopted. For example, read data such as conditional read data that cannot be read so long as a specific condition is met and unconditional read data that can be read unconditionally, status instruction data for executing a setup instruction for status contents of the player character, or communication result information including various kinds of information such as a terminal identification ID of the communication partner that is a delivering source of the received game information and a radio communication time period are obtained as the game information in the communication process described above to be stored. It is then determined whether the stored information can be read or not on the basis of various conditions. Thus, it is possible to improve the taste to play the video game while adding an element for heightening usage difficulty of game information communicated between video game apparatus main bodies. Here, the communication process at Step S112 corresponding to the other operation described above, which includes such a communication process, in the video game apparatus 100 of the present embodiment will first be described.

Figure 3:
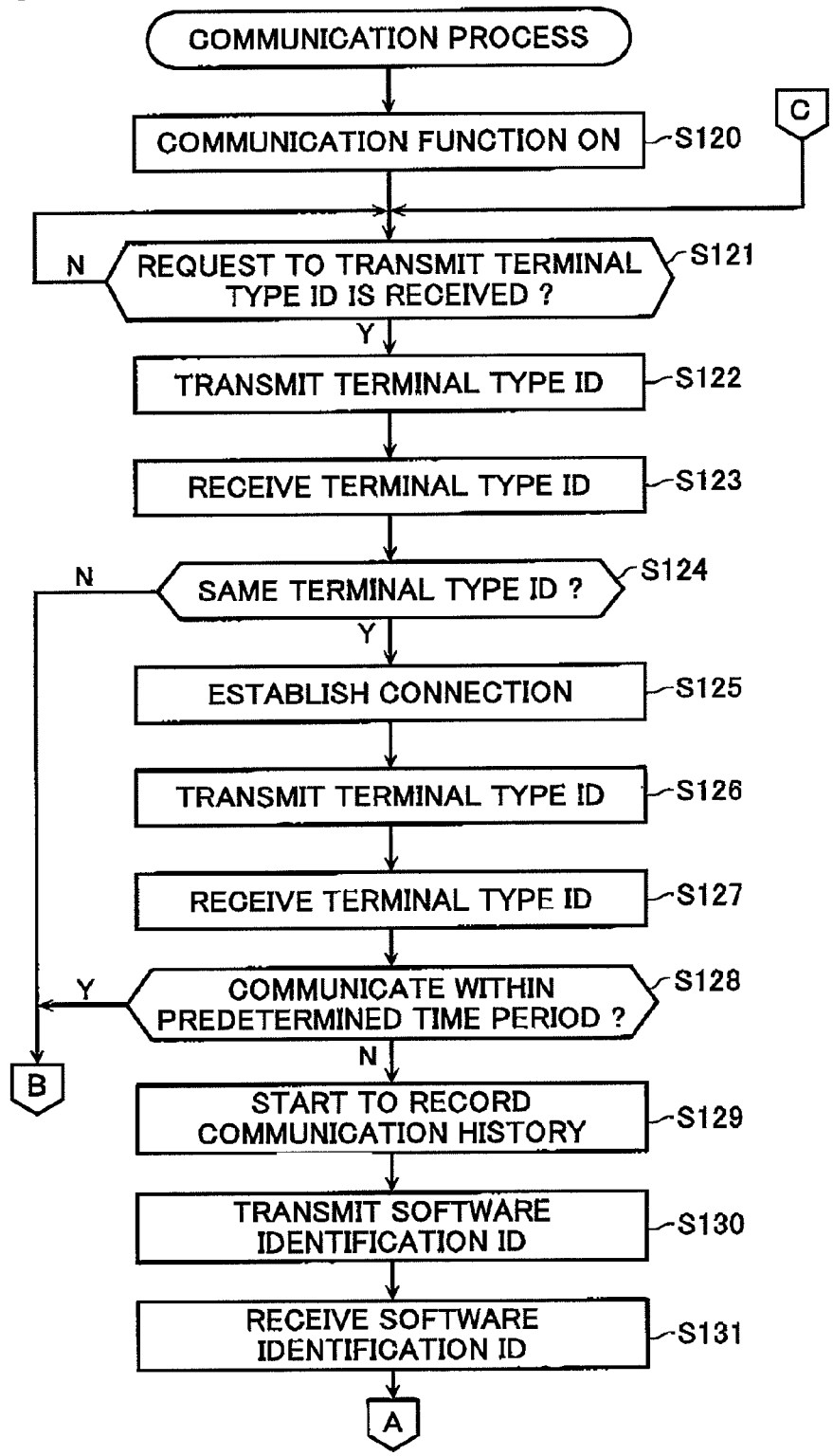
FIG. 3 is a flowchart that illustrates an example of a communication process.
Figure 4:
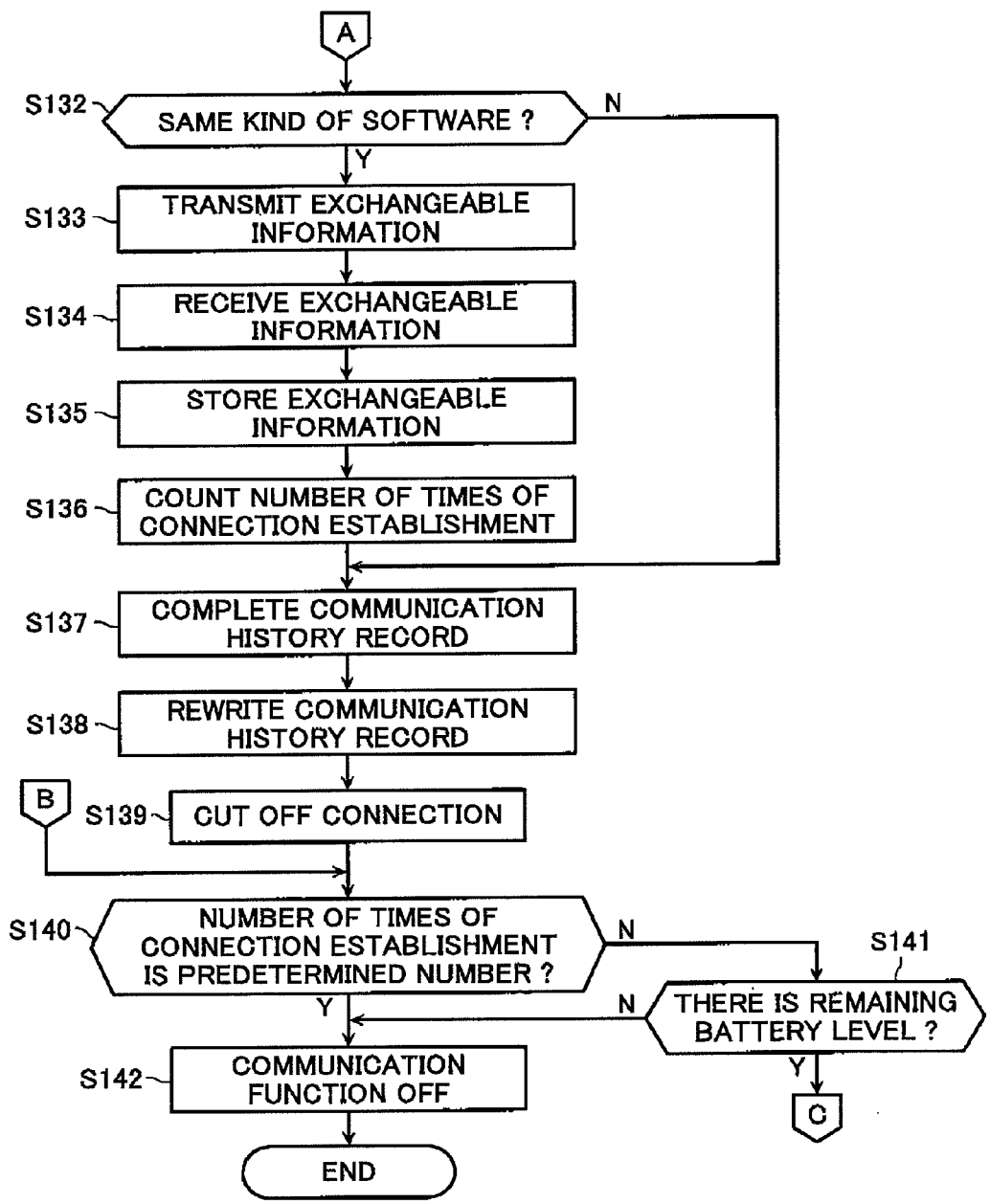
FIG. 4 is a flowchart that illustrates an example of a communication process.
Figure 5:
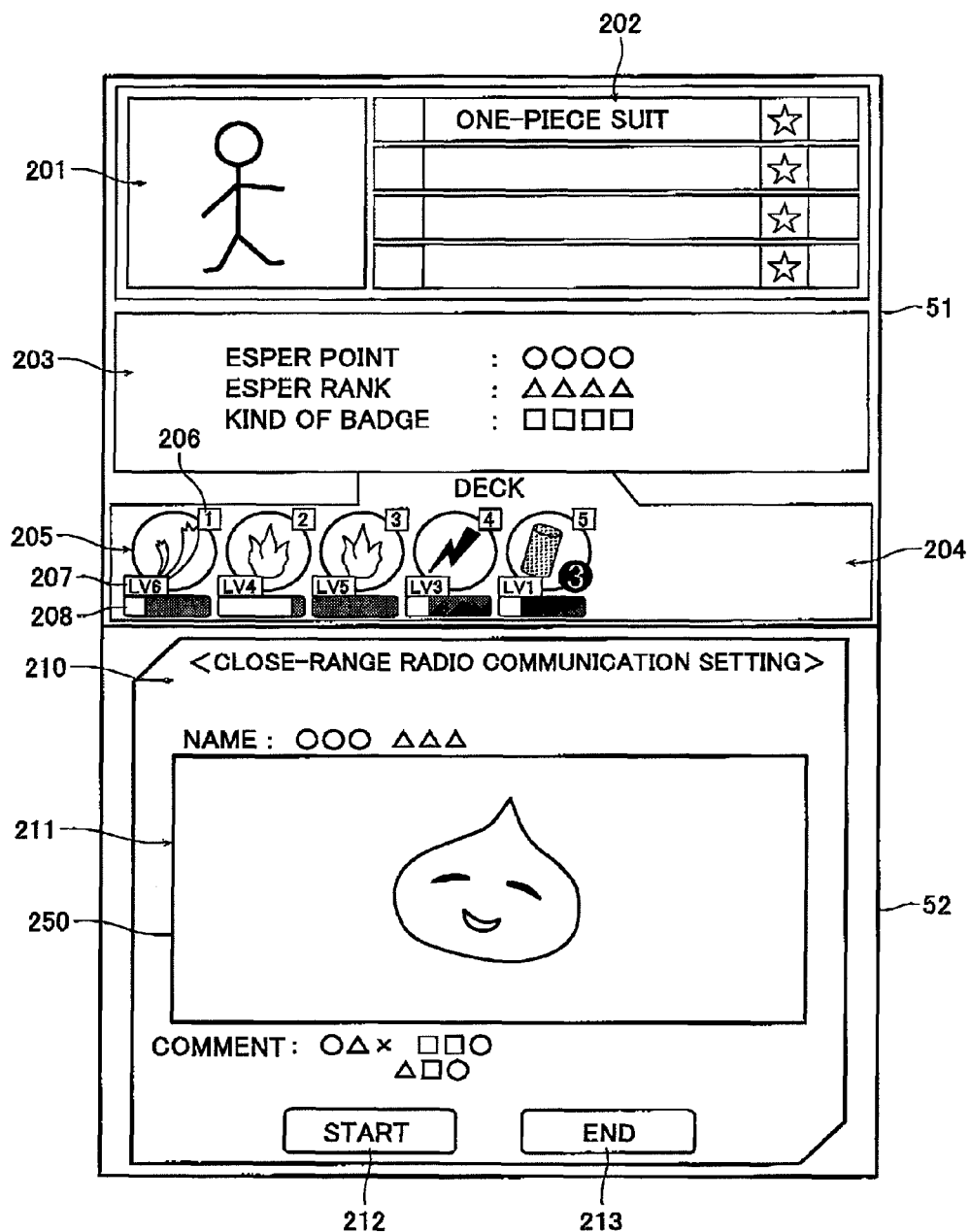
FIG. 5 is an explanatory drawing that shows an example of a communication setup screen of the display device.

FIGS. 3 and 4 are flowcharts that illustrate an example of a communication process in the video game apparatus 100 of the present embodiment. In this regard, in the following explanation, the same reference numeral is assigned to a component overlapping to the component that has already been described, and the explanation thereof is omitted. On condition that the communication process is executed, display examples of the upper and lower image display screens 51, 52 when operational input relating to setup of the close-range radio communication is executed on a top menu of a game screen at Step S111 of the flowchart shown in FIG. 2 will first be described. FIG. 5 is an explanatory drawing that shows an example of a communication setting screen on the display device 50 in the video game apparatus 100 of the present embodiment.

As shown in FIG. 5, for example, on the communication setting screen of the upper image display screen 51, a player character display region 201, an equipment display region 202, a status display region 203, and a display determining deck 204 are displayed. The player character display region 201 is used for displaying a player character PC. The equipment display region 202 is used for displaying equipment of the player character PC displayed on the player character display region 201. The status display region 203 is used for displaying various kinds of information relating to current status of the player character PC. The display determining deck 204 is used for determining a display form of each ability icon (such as a display order). The ability icon is used for causing the player to select available ability such as an attack and an item that are displayed on the lower image display screen 52 and that the player character PC can be utilized during a battle, for example. In this regard, in the following explanation, each ability icon is referred to as a "badge".

In a badge 205 displayed in the display determining deck 204, a priority tag 206 indicating execution (or activation) processing priority during a battle on a battle scene, a level display 207 indicating a level of ability of the badge 205 and a level meter 208 are displayed. A special effect by the ability indicated by the badge 205 is set so as to show a different effect for every level. In this case, although it is not shown in FIG. 5, the badge 205 is managed by a badge managing table. In the badge managing table, the kind of badge, a level, an effect due to one usage (specific attack power or a point of recovery power), a remaining point, an action pattern of the touch pen 41 to be activated, a necessary experience value and other information are included.

The kinds of badge 205 include, for example, a "thunder attack", a "flame attack", a "windy cut attack", an "object moving attack" and the like for badges relating to an attack. Further, the kinds of badge 205 include, for example, an "HP recovery due to medicine", "offensive power up", "defensive power up" and the like for badges that influence on the status of the player character.

The level is set for every badge 205. For example, it is defined so that the higher the level becomes, the greater the influence of a special effect executed by the badge becomes. In this regard, the level may not be set to such a kind of badge that a specific effect such as "exterminate all of enemy characters" is shown as the special effect, for example. The remaining point indicates a usable value (the number of usable times)/the usable maximum value (usable maximum number) of the special effect by means of the corresponding badge 205.

The necessary experience value defines an experience value (badge point: BP) required when to boost up (or improve) the level to the next for every badge 205. Otherwise, for example, information in which a time period (boot time) of the state where the ability indicated by the corresponding badge 205 becomes unusable for a predetermined time period until the remaining point returns to the usable maximum number in the case where the number of usable times of the special effect by the badge 205 becomes 0, and information such as an ability name indicated by the badge 205 and an ability ID for uniquely defining the ability indicated by the badge 205 are included.

Here, as the "action pattern of the touch pen 41" described above, in the video game apparatus 100 of the present embodiment, a method of operating the touch pen 41 with respect to an attack and the like of the player character PC on the lower image display screen 52 is carried out as follows, for example. Namely, the player carries out, for example, a predetermined input operation such as "poke", "rub", "enclose so as to draw a circle" and "draw a line" using the touch pen 41 onto a region of the lower image display screen 52 on which an enemy character to which the player wants to suffer an attack by the player character PC is displayed or a region of the lower image display screen 52 on which an object item that the player wants to move toward an enemy character is displayed. Thus, it is possible to apply the attack or the like corresponding to the input operation to the enemy character or the object item.

In the video game apparatus 100 of the present embodiment, the player can apply an attack instruction or the like to the player character PC quickly in this manner, and the attack can be applied to the image such as the displayed enemy character by directly carrying out the input operation with the touch pen 41. Thus, the player can obtain a feeling of operations readily, and this makes it possible to heighten realism (realistic sensation) of a battle scene on the player.

In this regard, in the video game apparatus 100 of the present embodiment, in the case of applying the attack or the like to the enemy character by carrying out the predetermined input operation described above, the kinds of selectable and executable attacks are to be displayed on the lower image display screen 52 by the badges 205 that expresses the contents of the attacks or the like abstractly. For this reason, for example, in the case where the input operation of "enclose so as to draw a circle" is in advance associated with an instruction to execute a "flame attack" in which the player character attacks the enemy character with flame in an action pattern of the badge managing table, it is need to include something indicating the "flame attack" in the badge 205 stored in the display determining deck 204 and displayed on the lower image display screen 52. In this regard, the predetermined input operation such as "enclose so as to draw a circle" is not limited to the input operation using the touch panel 40 and the touch pen 41. For example, the predetermined input operation may be configured to be carried out using an input device such as a mouse, a joystick and a trackball (not shown in the drawings).

On the other hand, on the communication setting screen of the lower image display screen 52, a profile display screen 210 for displaying a user profile of the player is displayed. On the profile display screen 210, a picture display region 211, a "START" button 212 and an "END" button 213 are displayed. The picture display region 211 is used for associating a picture or character arbitrarily drawn by the player using the touch pen 41 or the like with the user profile, and for displaying the picture or character as a sticker 250 that is stuck to a background image or an arbitrary screen in the video game. The "START" button 212 is used for instructing a start of the close-range radio communication. The "END" button 213 is used for instructing an end to display the communication setting screen. Further, on the profile display screen 210, a name display region and a comment display region are provided. The name display region is used for displaying a name of the player arbitrarily determined. The comment display region is used for displaying a comment of the player arbitrarily determined.

On the communication setting screen configured in this manner, when the player presses and selects the "start" button 212 of the profile display screen 210 using the touch pen 41, as shown in FIG. 3, the control section 11 controls the communications interface 17 so that the communication function is turned on, whereby various kinds of information can be transmitted and received (Step S120). The control section 11 then delivers a request to transmit a terminal classification ID to determine whether any terminal classification ID is received or not (Step S121). The control section 11 waits at Step S121 until a request to transmit terminal classification ID that is transmitted from other video game apparatus main body within a predetermined neighboring range is received ("No" at Step S121). In the case where it is determined that a request to transmit terminal classification ID is received ("Yes" at Step S121), the control section 11 transmits the terminal classification ID of the video game apparatus main body 10 to the other video game apparatus main body (Step S122).

After transmitting the terminal classification ID, the control section 11 receives the terminal classification ID from the other video game apparatus main body (Step S123), and compares the received terminal classification ID with the terminal classification ID of the video game apparatus main body 10. The control section 11 thereby determines whether or not the other video game apparatus main body is the same type of terminal as the video game apparatus main body 10 (Step S124).

In the case where it is determined that it is the same type of terminal as the video game apparatus main body 10 ("Yes" at Step S124), the control section 11 establishes a connection by one-on-one radio communication between the video game apparatus main body 10 and the other video game apparatus main body (Step S125), and transmits the terminal identification ID for individually identifying the terminal to the other video game apparatus main body with the radio communication (Step S126).

After transmitting the terminal identification ID, the control section 11 receives the terminal identification ID from the other video game apparatus main body with the radio communication (Step S127). The control section 11 then determines whether or not the received terminal identification ID is the same as the terminal identification ID stored in the RAM 12 or the like and displayed by means of communication history information. In addition, by referring to a time stamp displayed by means of the communication history information, the control section 11 determines whether or not the other video game apparatus main body is a terminal that executed communication with the video game apparatus main body 10 within a predetermined time period (for example, 1 hour) (Step S128).

In the case where it is determined that the other video game apparatus main body is not the terminal that executed communication within the predetermined time period ("No" at Step S128), the control section 11 starts to record the communication history information indicating communication history with the radio communication into the RAM 12 (Step S129). The control section 11 then transmits a software identification ID for identifying software of the video game utilized (or provided) in the video game apparatus main body 10 to the other video game apparatus main body (Step S130).

After transmitting the software identification ID, the control section 11 receives a software identification ID for identifying software of the video game utilized (or provided) in the other video game apparatus main body from the other video game apparatus main body (Step S131). As shown in FIG. 4, the control section 11 then compares the received software identification ID with the software identification ID of the video game apparatus main body 10 to determine whether the kinds of software are the same or not (Step S132).

In the case where it is determined that the kinds of software are the same ("Yes" at Step S132), the control section 11 transmits exchangeable information that can be exchanged with respect to software to the other video game apparatus main body as game information (Step S133). The control section 11 receives exchangeable information as game information from the other video game apparatus main body (Step S134), and stores the received exchangeable information into the RAM 12 or the like (Step S135). In this regard, the exchangeable information may include, for example, one badge 205 specified to arbitrarily exchange in advance among the badges 205 stored in the display determining deck 204, information on a badge indicating high scarcity, and game information such as various kinds of information displayed on the profile display screen 210 described above and image information indicating the sticker 250.

After storing the received exchangeable information, the control section 11 counts up the number of times of connection establishment at Step S125 described above (Step S136), and terminates the recording of the communication history information indicating the communication history with the radio communication in the RAM 12 (Step S137). In the case where the previous communication history information is already recorded in the RAM 12, the control section 11 overwrite save the communication history information for which the recording has been terminated (Step S138).

The control section 11 then cuts off the connection with the one-on-one radio communication that has been established between the video game apparatus main body 10 and the other video game apparatus main body (Step S139). The control section 11 determines whether or not the number of times of connection establishment counted up at Step S136 described above reaches a predetermined defined number (for example, 10 times) (Step S140). In the case where it is determined that the number of times of connection establishment reaches the defined number ("Yes" at Step S140), the control section 11 controls the communications interface 17 so that the communication function is turned off (Step S142), and terminates a series of processes in the present flowchart.

On the other hand, in the case where it is determined that the number of times of connection establishment does not reach the defined number ("No" at Step S140), the control section 11 determines whether there is a remaining battery level or not by measuring supply voltage of the video game apparatus main body 10 (Step S141). In the case where it is determined that there is the remaining battery level ("Yes" at Step S141), the processing flow shifts to Step S121 described above to repeatedly execute the processes. On the other hand, in the case where it is determined that there is no remaining battery level ("No" at Step S141), the control section 11 controls the communications interface 17 so that the communication function is turned off (Step S142), and terminates a series of processes in the present flowchart.

In this regard, in the case where it is determined that it is the same type of terminal at Step S124 described above ("No" at Step S124) or in the case where it is determined that the other video game apparatus main body is the terminal that executed communication within the predetermined time period at Step S128 described above ("Yes" at Step S128), the control section 11 causes the processing flow shifts to Step S140 described above to execute the determination process. Further, at Step S132 described above, in the case where it is determined that the kinds of software are not the same ("No" at Step S132), the control section 11 causes the processing flow shifts to Step S137 described above to terminate the recording of the communication history information.

The exchangeable information and the communication history information communicated between the video game apparatus main body 10 and the other video game apparatus main body at the communication process in this manner are converted into usable information that can be utilized for the software of the video game apparatus main body 10 to be utilized by the control section 11. Thus, it is possible to improve the taste to play the video game while effectively utilizing the communication function by actively utilizing various kinds of information communicated between the apparatuses when to exchange the game information with the radio communication.

Further, the exchangeable information stored at Step S135, the communication history information overwritten save at Step S138, or information indicating the terminal identification ID and the communication time period are stored as the game information or the communication result information to be utilized to play the video game. Since the stored information is set so as to be able to be utilized (for example, read) when a specific condition is met, or so as to be unconditionally read, it is possible to heighten usage difficulty of the game information communicated between the video game apparatus main bodies, and this makes it possible to improve the taste to play the video game.

Figure 6:
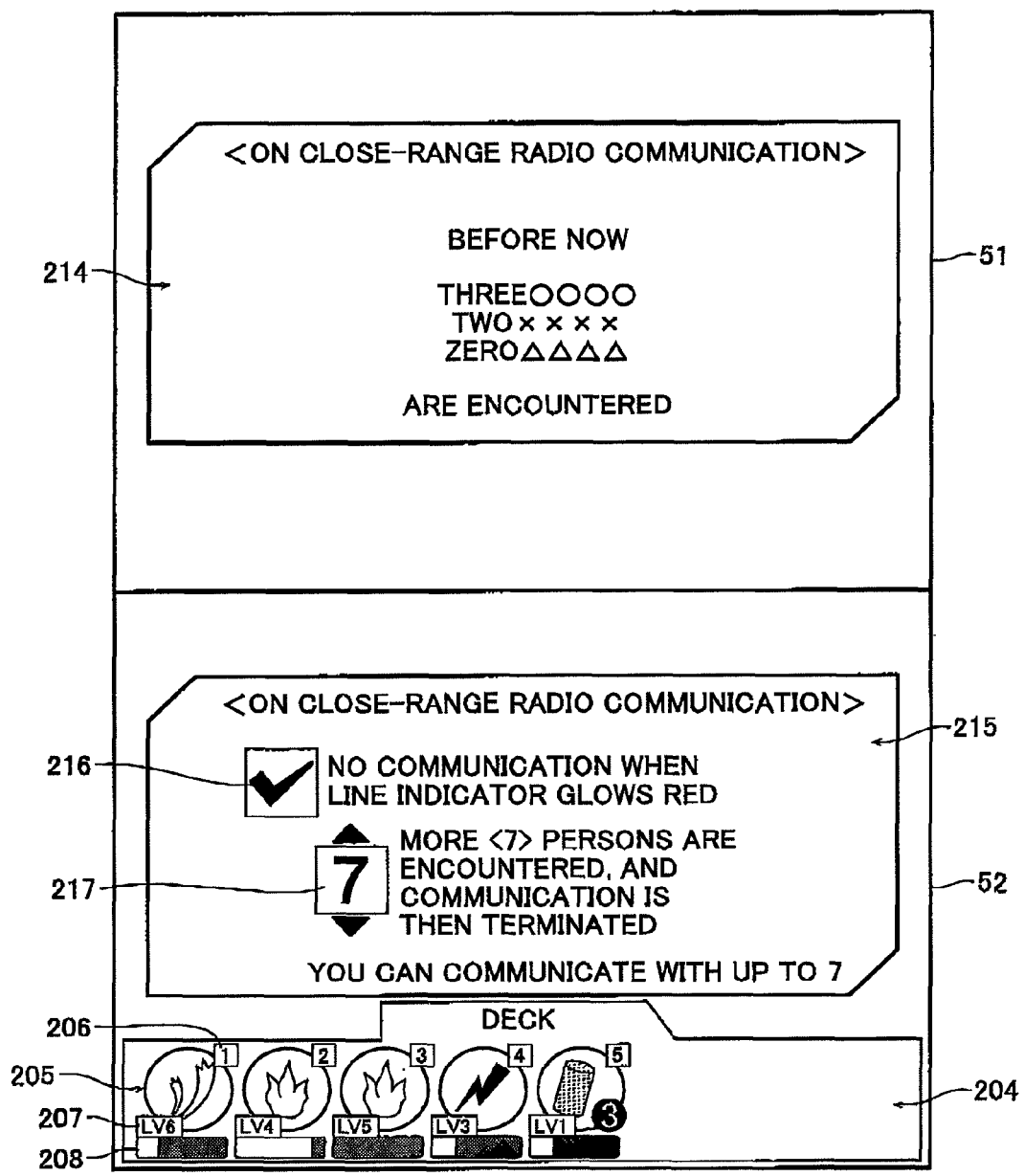
FIG. 6 is an explanatory drawing that shows an example of an on-communication screen of the display device.

Here, the image display screen when the communication process as described above is executed in the video game apparatus 100 of the present embodiment will now be described. FIG. 6 is an explanatory drawing that shows an example of an on-communication screen on the display device 50 in the video game apparatus 100 of the present embodiment.

As shown in FIG. 6, for example, in the on-communication screen, a progress display region 214 for presenting progress of the communication is displayed on the upper image display screen 51, an on-communication setting display region 215 for presenting setup available items on communication and the display determining deck 204 are displayed on the lower image display screen 52. In the progress display region 214, a character string "on close-range radio communication" indicating that the close-range radio communication is being executed, and a character string "before now, three 'four circles', two 'four crosses' and zero 'four triangles' are encountered" itemizing the other video game apparatus main bodies that the video game apparatus main body 10 encounters within the predetermined neighboring range on communication are displayed.

Here, the "four circles", the "four crosses" and the "four triangles" displayed in the progress display region 214 are defined in the video game apparatus 100 of the present embodiment as follows, for example. Namely, the "four circles" are counted up when the video game apparatus main body 10 encounters the other video game apparatus main body that is the same terminal as the video game apparatus main body 10 and utilizes the same software. The "four crosses" are counted up when the video game apparatus main body 10 encounters the other video game apparatus main body that is the same terminal as the video game apparatus main body 10, but utilizes other software than that of the video game apparatus main body 10. In this case, the "four triangles" are counted up in the case of other conditions than those described above. In the case where the communication in which the "four circles" are counted up is executed, the information on the sticker 250 displayed on the profile display screen 210 and the user profile, and status instruction data for executing a setup instruction of predetermined status contents for a character status are transmitted and received between the apparatuses and respectively stored in the video game apparatus main bodies in addition to the exchangeable information described above.

In the on-communication setting display region 215, items for various kinds of setting on communication are displayed. In the video game apparatus main body 10, the display of a line indicator is in advance changed into green when the remaining battery level is remained sufficiently, while the display of the line indicator is changed into red when the remaining battery level becomes lower. For example, a check box 216 for setting an item of a character string "no communication when line indicator glows red (that is, when the remaining battery level is low)" and a number-of-persons setting box 217 for setting a numeral indicating the number of persons in an item of a character string "more ## persons are encountered, and communication is then terminated" are displayed. By making it possible to set the items in this manner, it is possible to restrict the communication to being repeated without restriction by ignoring the remaining battery level and/or a remaining storage capacity of data. Otherwise, in the on-communication setting display region 215, although it is not shown in the drawings, an item of a character string "announce with sound" and an item of a character string "announce with vibration" may be provided when communication is executed. In this regard, the numeral presented in the number-of-persons setting box 217 is displayed so that the numeral is decremented in every close-range radio communication.

When the communication is executed in this manner, and, for example, the close-range radio communication is executed for the number of persons set by the number-of-persons setting box 217 (that is, the defined number set in advance), a communication result screen is displayed on the display device 50. In this case, in the number-of-persons setting box 217, such control as a character string "take priority of the count for 'four circles'" may be executed by making it possible to set the number-of-persons setting box 217 for every class of a communication partner. Thus, will be described later, in the case where a point related to the video game is added to each class of a communication partner, it is possible for the player to take priority of the counts of the communication partners that are most advantageous against the counts of the other classes of communication partners. For example, in the case where the person of "four circles" is more advantageous than the person of "four crosses" for the player, a character string "take priority of the counts of 'four circles'" is set. In addition, in the case where a person of "four circles" is newly encountered with encounters with seven persons of "four circles" and encounters with three persons of "four crosses" are already counted when a character string "more 10 persons are encountered, and communication is then terminated" is set, communication record for one person of "four crosses" is deleted, and encounters with eight persons of "four circles" and encounters with two persons of "four crosses" may be recorded.

Figure 7:
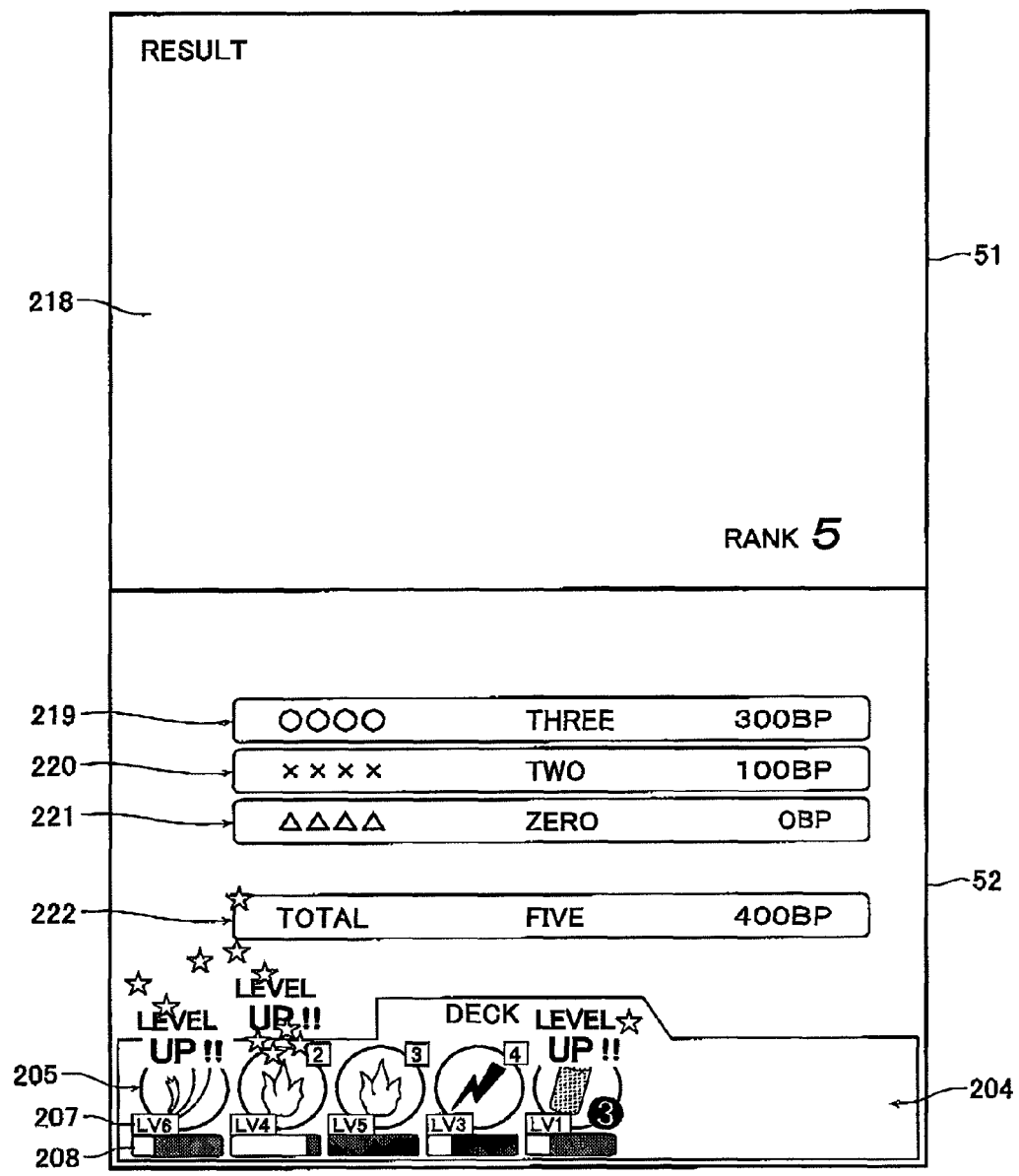
FIG. 7 is an explanatory drawing that shows an example of a communication result screen of the display device.

FIG. 7 is an explanatory drawing that shows an example of a communication result screen on the display device 50 in the video game apparatus 100 of the present embodiment. As shown in FIG. 7, on the communication result screen, a communication result display region 218 for presenting a communication result is displayed on the upper image display screen 51, a detailed communication result display regions 219, 220, 221, 222 for presenting details of the communication result and the display determining deck 204 are displayed on the lower image display screen 52. In the detailed communication result display regions 219, 220, 221, for example, how many persons of each of "four circles", "four crosses" and "four triangles" does the video game apparatus main body 10 execute the close-range radio communication with, and how many points of BP does the player obtain as a result are displayed. In the detailed communication result display region 222, a total result by the close-range radio communication is displayed.

In this regard, the BP may be set so that coefficients used for calculation of points to be applied are differentiated on the basis of the state of the communication partners such as "four circles", "four crosses" and "four triangles" with which the close-range radio communication is executed. For example, in the case of "four circles", it may be set to the number of communicated persons (the number of times)×100 BP. In the case of "four crosses", it may be set to the number of communicated persons (the number of times)×50 BP. In the case of "four triangles", it may be set to the number of communicated persons (the number of times)×300 BP.

The BP obtained in this manner is then added to a necessary experience value of the badge 205 stored in the display determining deck 204. In the case where it becomes the state where the necessary experience value defined by the badge managing table is met, the level of the badge 205 is boosted up. In the video game apparatus 100 of the present embodiment, by being configured in this manner, the player can play the video game using not only the game information but also the communication history information only by executing the close-range radio communication. In this regard, since the communication result information presenting the communication result, the communication history information presenting the communication history and the like are stored in the video game apparatus main body 10, the player can always read them.

Figure 8:
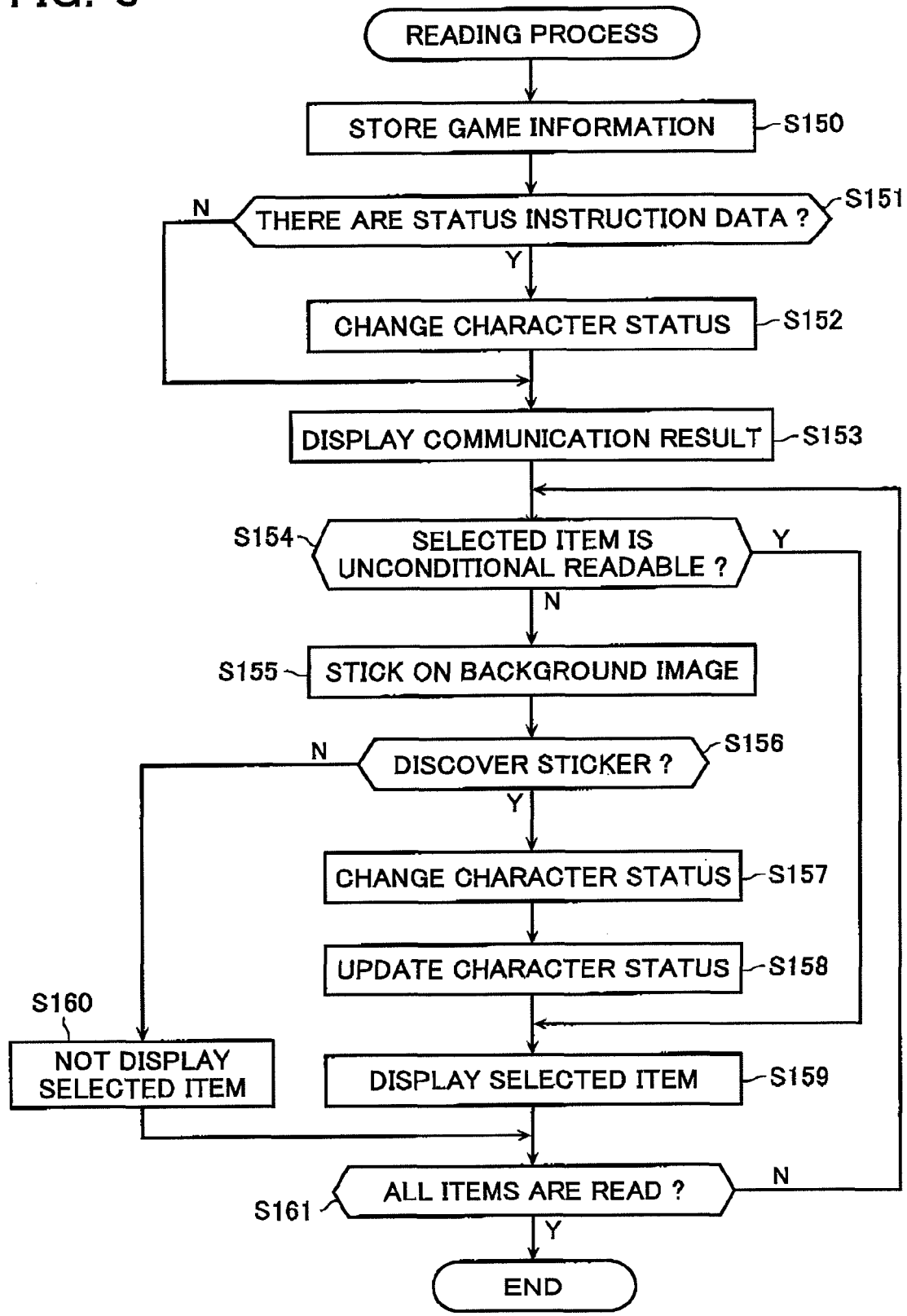
FIG. 8 is a flowchart that illustrates an example of a reading process.

Next, the reading process of read data that the player can read on the upper and lower image display screens 51, 52 of the display device 50 among the game information obtained and stored in the video game apparatus main body 10 in the communication process described above will now be described. FIG. 8 is a flowchart that illustrates an example of a reading process for read data on the display device 50 in the video game apparatus 100 of the present embodiment. In this regard, in the present embodiment, although the communication process includes processes in accordance with operations of a person (that is, the player) as a matter of convenience of the explanation, the control section 11 may execute all of the processes in the communication process.

The control section 11 first stores the game information obtained by the video game apparatus main body 10 in the communication process described above (Step S150). The control section 11 then determine whether or not there are status instruction data for executing a setup instruction of status contents indicated by the character status information of the player character PC in the stored game information (Step S151).

In the case where it is determined that there are the status instruction data ("Yes" at Step S151), the control section 11 changes the character status by changing the status contents indicated by the character status information on the basis of the status instruction data (Step S152). The control section 11 then causes the display device 50 to display the communication result screen presenting a communication result as will be described later by referring to the communication result information (Step S153). In the case where it is determined that there are no status instruction data ("No" at Step S151), the processing flow shifts to Step S153 described above, and the display device 50 is caused to display the communication result screen.

In the character status changing process at Step S152 described above, more specifically, for example, in the case where the status instruction data are data instructing to change the status contents to "subtract the HP of the number of times of communication×10 points" from the HP of the player character PC, the control section 11 calculates the number of times of the close-range radio communication to be executed and executes changing the status contents as described above by referring to the communication history information and the like included in the stored game information.

Figure 9A:
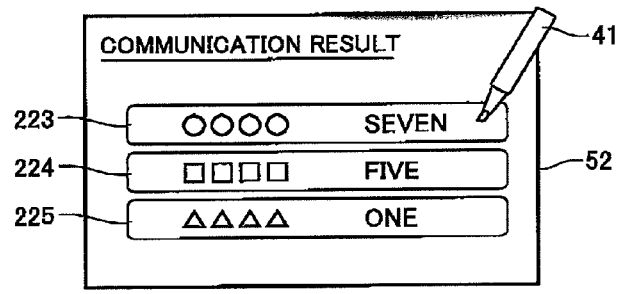
FIGS. 9A-9E are explanatory drawings that show an example of reading procedures in the communication result screen of the display device.

Here, the reading procedures on the communication result screen displayed at Step S153 will be described. FIGS. 9A-9E are explanatory drawings that show an example of reading procedures in the communication result screen of the display device on the display device 50 in the video game apparatus 100 of the present embodiment. As shown in FIG. 9A, when the communication result display process is executed at Step S153 described above, for example, a communication result including the detailed communication result display region 223, 224, 225 for respectively presenting the detailed results of the close-range radio communication with "four circles", "four crosses" and "four triangles" is displayed on the lower image display screen 52 of the display device 50. In this regard, the communication result can be displayed by selecting a read menu of the communication result from a top menu or the like, for example.

Figure 9B:
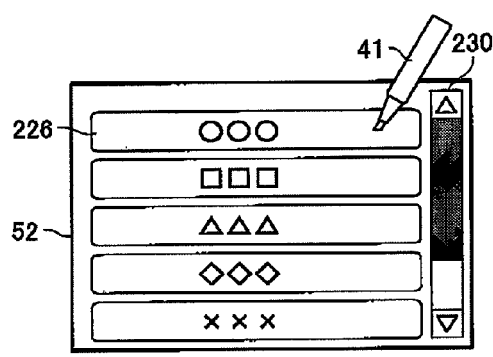

Then, for example, when the detailed communication result display regions 223 to 225 that the player wants to read are selected and determined using the touch pen 41, as shown in FIG. 9B, a list display region 226 of the user profiles, which has already been communicated (or stored), included in the detailed result is displayed. When an arbitrary user profile is selected and determined from the list display region 226 using the touch pen 41, as shown in FIG. 9C, a user profile detail display screen presenting details of the selected and determined user profile is displayed on the upper and lower image display screens 51, 52. In this case, the movement of a displayed item in the list display region 226 can be executed by operating a slider 230 by means of the touch pen 41.

Here, the user profile information indicates unconditional read data that can be read unconditionally among the game information stored at Step S150 described above, and the sticker 250 associated with the user profile information indicates conditional read data that cannot be read unless the specific condition is met.

On the detail display screen of the user profile, a contents display region 231 for displaying the contents of the user profile indicated by the user profile information is displayed on the upper image display screen 51, and a sticker display region 232 for displaying a picture and/or a comment of the user drawn in the picture display region 211 is displayed on the lower image display screen 52. The sticker 250 displayed in the sticker display region 232 is included in the user profile information of the stored game information so long as the sticker 250 is drawn and set in the picture display region 211 in advance. Thus, if there is any player who sets the sticker 250 among other players whom the player of the video game apparatus main body 10 communicates with, the sticker 250 can be read when a specific condition is met.

Figure 9D:
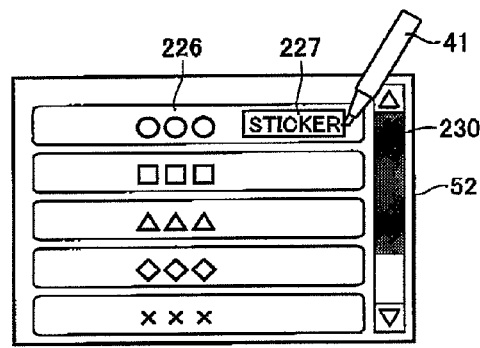
Figure 9C:
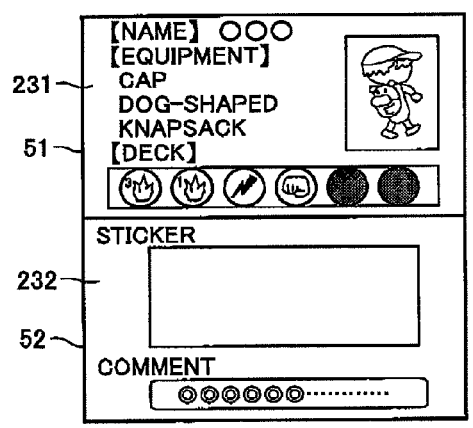
Figure 9E:
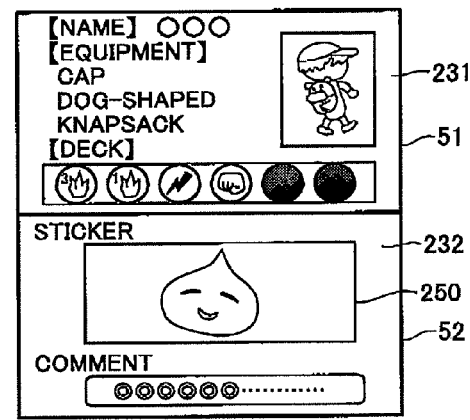

In the case where the sticker 250 becomes readable, for example, as shown in FIG. 9D, a display 227 indicating that the sticker 250 is in a readable state is made in the list display region 226. When the display 227 is selected and determined by means of the touch pen 41, as shown in FIG. 9E, the sticker 250 associated with the user profile is displayed in a sticker display region 232, whereby the player can read this sticker 250.

Namely, the control section 11 causes the display device 50 to display the communication result screen, and then determines whether or not unconditional read data that can be read unconditionally (for example, the user profile information except for the sticker 250) are included in the items such as an arbitrary user profile in the list display region 226 selected by the player using the touch pen 41 or the like, and such data can be read unconditionally (Step S154). In the case where it is determined that such data cannot be read unconditionally (that is, the sticker 250 is included in the user profile information) ("No" at Step S154), the control section 11 incorporates the image information indicated by the sticker 250 into the image information presenting a background of the game screen, for example, and sticks the sticker 250 to the background image (Step S155).

Figure 10:
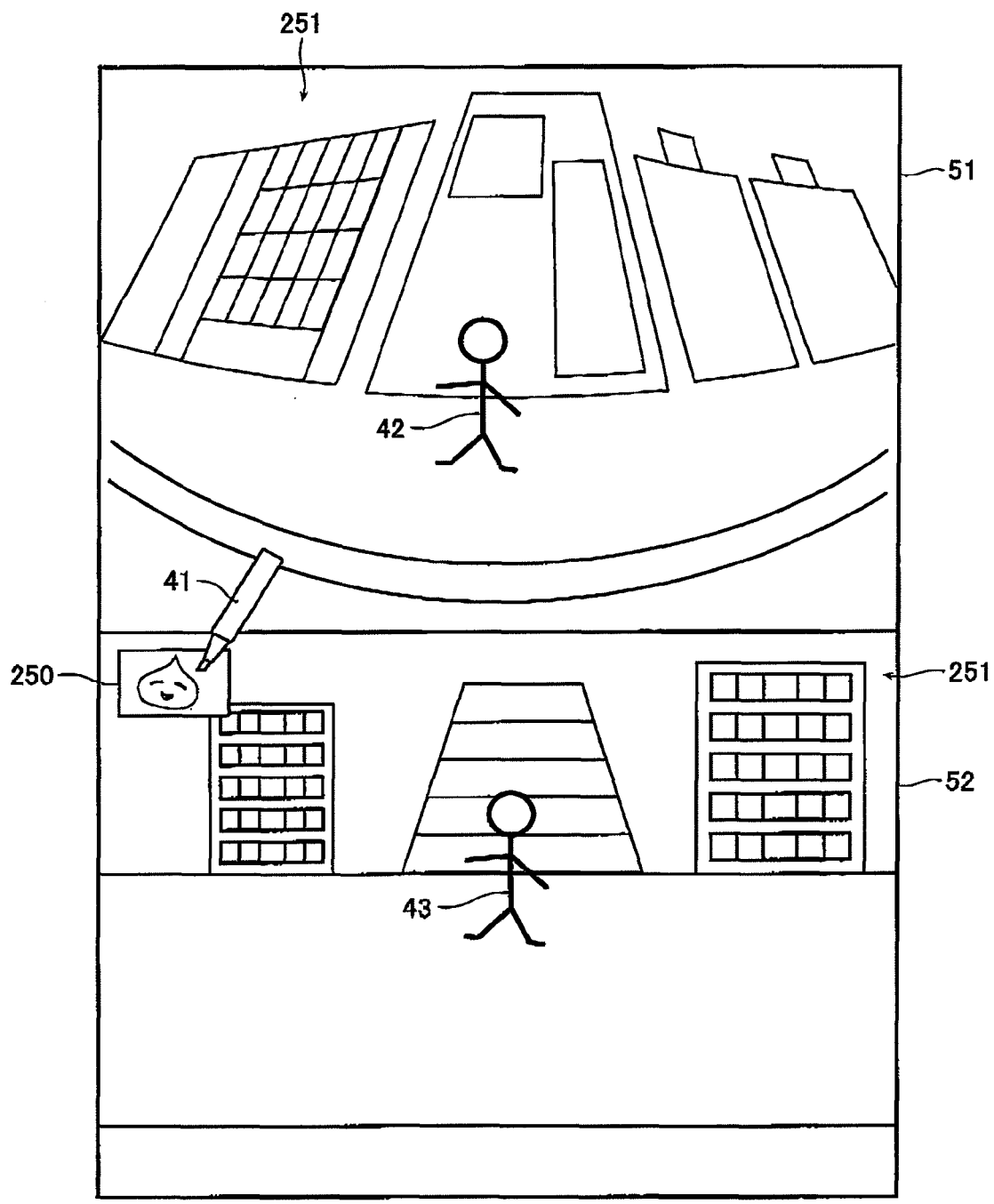
FIG. 10 is an explanatory drawing that shows an example of a game screen of the display device.

Here, the game screen on the upper and lower image display screens 51, 52 when the sticker 250 is stuck to the background image will be described. FIG. 10 is an explanatory drawing that shows an example of the game screen on the display device 50 in the video game apparatus 100 of the present embodiment. As shown in FIG. 10, for example, in the game screen of not a battle scene but a movement scene, player characters 42, 43 are respectively displayed in the vicinity of the central portions of the upper and lower image display screens 51, 52. A background image 251 presenting a building, a road and the like is displayed in each of the upper and lower image display screens 51, 52.

In the case where the sticker 250 is included in the user profile information, and is in a state where it is never read, as shown in FIG. 9B, the display 227 is not, displayed in the list display region 226. The sticker 250 is displayed at Step S155 described above, for example, so as to be stuck to the inside of the background image 251 on the lower image display screen 52.

Sticking of the sticker 250 to the background image 251 is executed as follows, for example. Namely, by automatically rewriting (or modifying) part of software of the video game executed in the video game apparatus main body 10, in the game information of the video game apparatus main body 10 obtained and stored from the other video game apparatus main body in the communication process, the image information presenting the sticker 250 is incorporated into the image information presenting the background image 251, whereby the sticker 250 is displayed so as to be stuck to the background image 251.

More specifically, script data are included in the game information to be exchanged in the communication process. The script data are configured so that a predetermined script is executed by the control section 11 as a trigger when the video game apparatus main body 10 obtains the script data. The predetermined script of the script data is executed by the control section 11 of the video game apparatus main body 10. By rewriting a predetermined portion of the program of the software (here, a portion relating to drawing of the background image 251) into predetermined contents (here, sticker 250 is stuck to a predetermined position of the background image 251), the sticking is executed.

In this regard, a stuck position of the sticker 250 in the background image 251 by execution of the predetermined script is randomly determined in the software of the video game apparatus main body 10 that obtains the game information, or determined in the background of the game screen in a stage to which the player next proceeds in the video game.

Further, in the video game executed in the video game apparatus main body 10 that obtains the game information, the stuck position may be configured so as to be determined in the backgrounds of the game screen randomly selected from the stages that the player has already cleared, or so as to be freely determined from backgrounds of all stages included in the video game by the player utilizing the other video game apparatus main body that transmits the game information to the video game apparatus main body 10.

Moreover, the stuck position may be determined to a given position of the stage that has already been cleared among all of the stages included in the video game by the player utilizing the other video game apparatus main body that transmits the game information to the video game apparatus main body 10, or randomly determined in the software of the video game apparatus main body 10 that obtains the game information among the stages that the player has already cleared. In the case where the player of the video game apparatus main body that transmits the game information can arbitrarily set the stuck position of the sticker 250, it is possible to apply "pleasure to hide" the sticker 250 in an arbitrary position of the background image 251 to the player as a new plan. Thus, it is possible to improve the interest of the player in the video game further.

In the case where the sticker 250 is stuck to the background image 251 in this manner, the display 227 is displayed in the list display region 226. In the case where a specific condition for making the sticker 250 readable, for example, as shown in FIG. 10, is set in advance so as to select (or discover) the sticker 250 stuck to the background image 251 using the touch pen 41 or the like, the display 227 is displayed in the list display region 226 by using the sticker 250 as shown in FIG. 9D, and the sticker 250 is readably displayed in the sticker display region 232.

Thus, the control section 11 sticks the sticker 250 to the background image 251 and determines whether or not the sticker 250 is discovered (Step S156). In the case where it is determined that the sticker 250 is discovered ("Yes" at Step S156), the control section 11 changes the character status by changing the status contents indicated by the character status information on the basis of the status instruction data with discovery of the sticker 250 (Step S157), and rewrites and update the character status information (Step S158). The control section 11 then causes the display device 50 to display the display 227 in the list display region 226. In the case where the display 227 is selected, the control section 11 causes the display device 50 to display the sticker 250 in the sticker display region 232 as the selected item (Step S159).

In the character status changing process at Step S157 described above, more specifically, for example, in the case where the status instruction data are data for instructing to change the status contents "add the HP of the number of discovered stickers 250×30 points" from the HP of the player character PC, the control section 11 calculates the number of stickers 250 discovered by the player, and executes changing the status contents as described above.

After the sticker 250 is displayed in the sticker display region 232, the control section 11 determines whether or not all of the stickers 250 included in the exchanged user profile information are read, for example, by referring to the communication result information and the communication history information to determine whether all of the remaining items are read or not (Step S161). In the case where it is determined that all of the stickers 250 are read ("Yes" at Step S161), the control section 11 terminates a series of processes in the present flowchart. In the case where it is determined that all of the stickers 250 are not read ("No" at Step S161), the processing flow shifts to Step S154 described above to repeatedly execute the processes.

In this regard, at Step S154 described above, in the case where it is determined that the selected item can be read unconditionally (that is, the sticker 250 is not included in the user profile information) ("Yes" at Step S154), the processing flow shifts to Step S159 described above, and the control section 11 causes the display device 50 to display the detail display screen of the user profile as the selected item as shown in FIG. 9C. Further, at Step S156 described above, in the case where it is determined that the sticker 250 is not discovered ("No" at Step S156), the control section 11 causes the display device 50 to leave not displaying the sticker 250 as the selected item (Step S160), and the processing flow shifts to Step S161 described above.

In the video game apparatus 100 of the present embodiment, it can be configured so that the sticker 250 included in the user profile information can be read easily, for example, by executing the reading process. This makes it possible to heighten the usage difficulty of the game information. Thus, it is possible to improve the taste to play the video game, and it is possible to improve the interest of the player in the video game.

Further, in the video game apparatus 100 of the present embodiment, for example, by exchanging the game information (that is, exchanging the user profile information including the sticker 250), the character status contents are changed so that the HP of the player character PC is reduced once. However, the character status contents are changed so that the HP of the player character PC is increased in accordance with the number of discovered stickers 250 stuck to the background image in the game screen. Thus, since the HP is finally increased more than that before the start of communication by discovering all of the stickers, it is possible to provide the player with incentive to actively play the video game using the communication function. This makes it possible to further improve the taste and the interest of the player to play the video game.

Moreover, the sticker 250 is not only stuck to the background image 251 in the game screen, but also may be stuck to a given place in the game screen, displayed on a given screen for reading (for example, a display dedicated screen for the sticker 250) so that the player can read the sticker 250, or set so as to be displayed in a given place or screen by the player. In addition, in the case where the communication process with the other video game apparatus main body having the user profile information in which the sticker 250 has already been discovered is executed again to exchange the game information or the like, in the communication process of twice or later, the character status contents indicated by the character status information of the player character PC may be set so as not to be changed, or may be configured so as to execute changing the character status contents by implementing a specific quest, a mini game or the like.

In this regard, although the sticker 250 has been explained in the reading process described above, for example, the video game apparatus 100 may be configured so that the badge 205 displayed in the display determining deck 204 is exchanged in the communication process, and ones specified for exchange or ones having high scarcity (in the case where there is no specification) among the badges 205 stored in the display determining deck 204 of an exchange partner (the other video game apparatus main body 10) are availably and readably displayed at a predetermined scene, for example, in the video game executed in the video game apparatus main body 10 (which receives the badges 205 in the exchange operation), or are displayed in a badge list of a badge shop that appears in the video game (in the case where the badge 205 is set to be able to buy and sell.

Figure 11:
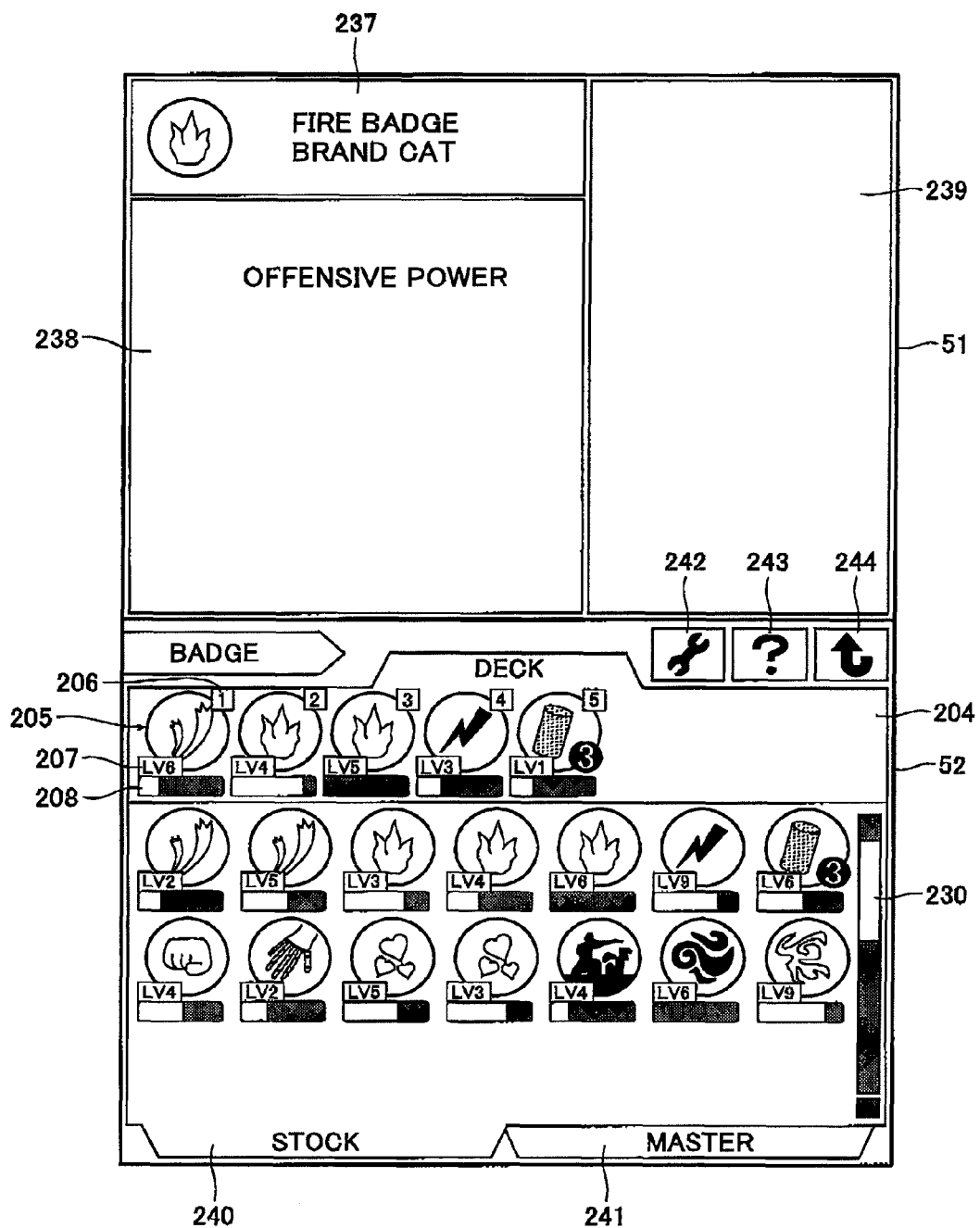
FIG. 11 is an explanatory drawing that shows an example of a badge setup screen of the image display screen.

Here, in the video game apparatus 100 of the present embodiment, the badge 205 exchanged between the video game apparatus main body 10 and the other video game apparatus main body as the game information in addition to the user profile information including the sticker 250 and utilized in the video game can be subjected to various setup on a setting screen for selectable badges from the top menu of the game screen, for example. FIG. 11 is an explanatory drawing that shows an example of a badge setting screen on the display device 50 in the video game apparatus 100 of the present embodiment.

As shown in FIG. 11, on the badge setting screen, the display determining deck 204 in which the badge 205 is stored, a stock window 240, and a master window 241 are displayed on the lower image display screen 52. The stock window 240 is used for displaying replaceable badges 205 in the display determining deck 204. The master window 241 is used for displaying the badge 205 whose level becomes the maximum value (master). In each of the stock window 240 and the master window 241, a slider 230 as described above is provided. It is possible to move the display position of the displayed badge 205 by operating the slider 230. Further, a badge help screen is displayed on the upper image display screen 51. The badge help screen is used for displaying various kinds of information on the badge 205 finally selected by the player by means of the touch pen 41 in the display determining deck 204, the stock window 240 and the master window 241.

The badge help screen is configured so as to include a detailed display region 237, an attribute display region 238, and an information display region 239. The detailed display region 237 is used for displaying the image and name of the badge 205. The attribute display region 238 is used for displaying attribute information and the like of the badge 205 displayed in the detailed display region 237. The information display region 239 is used for displaying other information. Further, an icon 242, an icon 243 and an icon 244 are displayed on the lower image display screen 52. The icon 242 is used for shifting a customizing screen in which a sort of the badge 205 displayed in the stock window 240 or the master window 241, setup of On/Off for the sort, sort standard priority and the like may be customized. The icon 243 is used for displaying operable items in the badge setting screen by the player. The icon 244 is used for terminating the badge setting screen.

In this regard, although illustration is omitted, a shortcut tag is displayed in the badge 205 to which a shortcut is set. The shortcut is used for instructing execution of a special effect by ability of the badge 205 that corresponds to an input operation to an input device in addition to the processing priority indicated by the priority tag 206 described above displayed in the display determining deck 204. The shortcut tag is displayed with a predetermined display color such as red and blue on the basis of the setup conditions. The special effect by the ability of the badge 205 displayed in the shortcut tag is immediately executed (or activated) by pressing the group of buttons 32, the R1 button 36, or the L1 button 33 of the keypad 30 as the shortcut key to which the shortcut is set independently of the input operations of the touch pen 41.

Namely, for example, the video game apparatus 100 may be configured so that the R1 button 36 is associated with the shortcut tag displayed with blue and the L1 button 33 is associated with the shortcut tag with red, whereby the player is allowed to view the badge 205 to which the shortcut is set at a glance. Further, the video game apparatus 100 may be configured so that when the shortcut key for executing the ability of the badge 205 to which the shortcut is set is pressed, the badge 205 having higher processing priority is executed among the badges 205 displayed in the display determining deck 204. In this case, when the badges 205 having higher processing priority is in a boot state, the badges 205 having secondly higher processing priority may be executed. Moreover, the video game apparatus 100 may be configured so that when the shortcut key is pressed, any one of the badges 205 to each of which the shortcut is set is randomly executed. Since the shortcut is set in this manner, it is possible to improve the interest of the player in the video game.

Further, the movement of the badge 205 between the display determining deck 204, the stock window 240 and the master window 241 in the badge setting screen can be carried out by selecting and dragging the badge 205 that the player wants to move toward a destination using the touch pen 41, for example. In this regard, the priority tag 206 is defined so that the less the numeral displayed in the badge 205 is, the higher the processing priority thereof becomes, for example. For this reason, in the video game apparatus 100 of the present embodiment, the video game apparatus 100 can be configured so that the same kinds of badges are stored in the display determining deck 204, and the player character obtains a special effect of a different level in accordance with the processing priority.

As described above, in the video game apparatus 100 of the present invention, the video game apparatus 100 is configured so that in the case where the communication is executed between the video game apparatus main body 10 and the other video game apparatus main body with the close-range radio communication, in addition to exchange of the badge 205 and the like, the level of the badge 205 can be boosted on the basis of the various kinds of information indicated by the communication history information, or the player is allowed to play the video game while the sticker 250 included in the user profile information of other player cannot be read easily. Thus, in a closed game playing space in one video game apparatus 100, an influence of other player can be reflected, various kinds of information obtained by the communication can be utilized, or the player can play the video game so that usage difficulty of the information is heightened on purpose. Therefore, it is possible to improve the interest of the player in the video game, and it is possible to improve the taste to play the video game while effectively utilizing the communication function.

As explained above, in the embodiment described above, the video game apparatus 100 is configured so that: the game information delivered from the other video game apparatus main body different from the video game apparatus main body 10 with radio communication; for example, the sticker 250 (conditional read data) that cannot be read unless the specific condition is met and the user profile information (unconditional read data) that can be read unconditionally are stored as the received game information (see Step S150); the read data indicated by the stored game information is set to readable, and during progress of the video game, it is determined whether the specific condition (for example, sticker 250 is discovered in the background image 251, and the like) is met or not; when the game information indicates unconditional read data, the unconditional read data are set to readable in the case where the unconditional read data are stored; and when the game information indicates conditional read data, the conditional read data are set to readable in the case where it is determined that the specific condition is met. Thus, an element to heighten usage difficulty of the game information obtained and stored with the radio communication between the video game apparatus main bodies can be added to the video game, and this makes it possible to improve the taste to play the video game.

Further, in the embodiment described above, the apparatus identification information capable of specifying the other video game apparatus main body that delivered the received game information (for example, terminal classification ID, terminal identification ID and the like) and the communication result information including the radio communication time period with the other video game apparatus main body may be stored. In this case, it is possible to specify the video game apparatus main body that delivered the game information. In addition, by actively utilizing the communication result information stored with the communication with the specified video game apparatus main body, predetermined game information can be utilized in the case where the specific condition is met. Thus, it is possible to heighten the usage difficulty of the game information between the video game apparatus main bodies, and this makes it possible to improve the taste to play the video game.

Moreover, in the embodiment described above, the character status information of the player character PC may be updated in accordance with the number of pieces of the stored communication result information. In this case, it is possible to actively utilize the communication result information in the video game. Thus, it is possible to improve the taste to play the video game while heightening the usage difficulty of the game information communicated between video game apparatus main bodies.

Furthermore, in the embodiment described above, the game information includes the read data and the status instruction data for executing a setup instruction of the predetermined status contents, and the status information of the player character PC is updated in accordance with the status instruction data so as to become the predetermined status contents (see Steps S152, S157 and S158). Thus, it is possible to influence on the character status contents of the player character PC on the basis of the game information communicated between the video game apparatus main bodies. Therefore, it is possible to improve the taste to play the video game while heightening the usage difficulty of the game information communicated between video game apparatus main bodies.

Further, in the embodiment described above, the read data indicated by the game information are background data indicating the background image 251 displayed on the upper and lower image display screens 51, 52 of the display device 50. Thus, it is possible to influence on the background image 251 of the game screen on the basis of the game information communicated between the video game apparatus main bodies. Therefore, it is possible to improve the taste to play the video game while heightening the usage difficulty of the game information communicated between video game apparatus main bodies.

Moreover, in the embodiment described above, the read data indicated by the game information may be set to readable on an arbitrary screen. In this case, it is possible to influence on various screens of the game screen on the basis of the game information communicated between the video game apparatus main bodies. Thus, it is possible to improve the taste to play the video game while heightening the usage difficulty of the game information communicated between video game apparatus main bodies.

Furthermore, in the embodiment described above, it may be determined that the specific condition is met in the case where the arbitrary screen in which the read data indicated by the conditional read data is set to readable are displayed on the upper and lower image display screens 51, 52 of the display device 50. In this case, the arbitrary screen can influence on the video game on the basis of the game information communicated between the video game apparatus main bodies. Thus, it is possible to improve the taste to play the video game while heightening the usage difficulty of the game information communicated between video game apparatus main bodies.

Further, although the video game apparatus main body 10 and the display device 50 are constructed from separate components in the embodiment described above, the display device 50 may be incorporated in the video game apparatus main body 10, as will be readily apparent to those skilled in the art, without departing from the scope of spirit of the present invention. The display device 50 may include any image display screen other than the upper and lower image display screens 51, 52. In addition, the display device 50 may be constituted so that one image display screen is divided into a plurality of image display screens in order to obtain a similar effect.

Moreover, although one example of the video game control for the RPG has been explained in the embodiment described above, there is no wonder that the technique of the present invention can be applied to similar video games such as a gun action RPG. In addition, the technique of the present invention can also be applied to other kinds of video games appropriately, as will be readily apparent to those skilled in the art, without departing from the scope of spirit of the present invention.

Furthermore, although an aspect of the present invention has been described with the video game apparatus 100 as an example in the embodiment described above, the present invention is not limited thereto. The present invention can be applied to various apparatuses such as a personal computer, a cellular phone terminal, a portable game apparatus and the like as long as such an apparatus has an image generating function. In this regard, in the case where the present invention is applied to a portable game apparatus or the like, a small-sized storage medium such as a semiconductor memory card may be used as the storage medium 70 described above in place of a CD-ROM or DVD-ROM, or any other type of storage medium as those skilled in the art will appreciate without departing from the scope or spirit of the present invention.

Further, in the embodiment described above, it has been described that game data for causing the video game apparatus main body 10 (video game apparatus 100) to execute the various processes described above (that is, various data such as control program data used for the video game) are stored in the storage medium 70. However, the present invention is not limited thereto. The video game data may be delivered by a server apparatus such as a network server (WWW server), or other computer device connected (either wired or wireless) to a network, such as the Internet, a local area network, a wide area network, or the like, or any combination thereof. In this case, the video game apparatus main body 10 may obtain the video game data delivered by the server apparatus via the communication network 80, and store the video game data in the HDD 13. The video game data may be used by being loaded on the RAM 12 from the HDD 13. In this regard, although the video game data are explained in the embodiment described above, such data may include at least control program data for causing a computer to execute the image generating process in the embodiment as described above.

The present invention can be applied to a video game machine, a personal computer, a cellular phone terminal, a portable game apparatus or the like, or any combination thereof that causes an image display apparatus to display a player character on an image display screen, and controls progress of a video game by controlling an action of the player character displayed on the image display screen in response to an operation by a player. Therefore, the present invention is useful.

What is claimed is:

1. A video game processing apparatus that causes an image display apparatus to display a player character on an image display screen of the image display apparatus, the video game processing apparatus controlling a progress of a video game by controlling an action of the player character to be displayed on the image display screen in accordance with operations by a player, the video game processing apparatus comprising:

an information receiver that searches for other video game processing apparatuses, which are other parties present within a communication range of the video game processing apparatus of the player, establishes, when a found video game processing apparatus of the other video game processing apparatuses is found, a wireless one-to-one communication link to the found video game processing apparatus automatically, and receives game information from the found video game processing apparatus by close-range radio communication, the game information including conditional read data, unconditional read data, and conversion execution data, the conditional read data being unreadable until a specific condition is met, the unconditional read data being readable unconditionally, the conversion execution data being for rewriting an arbitrary part of a game program of the video game stored by the video game processing apparatus of the player that receives the game information;

a rewriter that rewrites, as a trigger when the game information is acquired by the video game processing apparatus of the player, data at the arbitrary part of the game program in accordance with the conversion execution data included in the game information;

a condition determiner that determines whether the specific condition is met during the progress of the video game, the condition determiner determining that the specific condition is met when a predetermined processing is carried out for the arbitrary part of the game program at which the data are rewritten by the rewriter; and
a condition releaser that changes the game information so that the conditional read data becomes readable for the player when the condition determiner determines that the specific condition is met.

2. The video game processing apparatus according to claim 1, further comprising:
a communication result information memory that stores communication result information, the communication result information including apparatus identification information and a time period of the close-range radio communication with the found video game processing apparatus, the apparatus identification information specifying the found video game processing apparatus that delivered the received game information.

3. The video game processing apparatus according to claim 2, further comprising:
a status information updater that updates status information of the player character in accordance with a number of pieces of the communication result information stored in the communication result information memory.

4. The video game processing apparatus according to claim 3, wherein the rewriter is configured to randomly select the arbitrary part of the game program at which the data are to be rewritten whenever game information is received from any other of the other video game processing apparatuses.

5. The video game processing apparatus according to claim 3, wherein a second player of the found video game processing apparatus who is a transmitter of the game information corresponding to the conversion execution data is allowed to set the arbitrary part of the game program at which the data are rewritten by the rewriter.

6. The video game processing apparatus according to claim 3, wherein the arbitrary part of the game program at which the data are rewritten by the rewriter is arbitrarily selected from background data displayed while playing a game, and
wherein the predetermined processing is processing for carrying out an operation to find and specify the rewritten part of the background data.

7. The video game processing apparatus according to claim 2, wherein the rewriter is configured to randomly select the arbitrary part of the game program at which the data are to be rewritten whenever game information is received from any other of the other video game processing apparatuses.

8. The video game processing apparatus according to claim 2, wherein a second player of the found video game processing apparatus who is a transmitter of the game information corresponding to the conversion execution data is allowed to set the arbitrary part of the game program at which the data are rewritten by the rewriter.

9. The video game processing apparatus according to claim 2, wherein the arbitrary part of the game program at which the data are rewritten by the rewriter is arbitrarily selected from background data displayed while playing a game, and
wherein the predetermined processing is processing for carrying out an operation to find and specify the rewritten part of the background data.

10. The video game processing apparatus according to claim 1, wherein the rewriter is configured to randomly select the arbitrary part of the game program at which the data are to be rewritten whenever the game information is received from any other of the other video game processing apparatuses.

11. The video game processing apparatus according to claim 10, wherein a second player of the found video game processing apparatus who is a transmitter of the game information corresponding to the conversion execution data is allowed to set the arbitrary part of the game program at which the data are rewritten by the rewriter.

12. The video game processing apparatus according to claim 10, wherein the arbitrary part of the game program at which the data are rewritten by the rewriter is arbitrarily selected from background data displayed while playing a game, and
wherein the predetermined processing is processing for carrying out an operation to find and specify the rewritten part of the background data.

13. The video game processing apparatus according to claim 1, wherein a second player of the found video game processing apparatus who is a transmitter of the game information corresponding to the conversion execution data is allowed to set the arbitrary part of the game program at which the data are rewritten by the rewriter.

14. The video game processing apparatus according to claim 13, wherein the arbitrary part of the game program at which the data are rewritten by the rewriter is arbitrarily selected from background data displayed while playing a game, and
wherein the predetermined processing is processing for carrying out an operation to find and specify the rewritten part of the background data.

15. The video game processing apparatus according to claim 1, wherein the arbitrary part of the game program at which the data are rewritten by the rewriter is arbitrarily selected from background data displayed while playing a game, and
wherein the predetermined processing is processing for carrying out an operation to find and specify the rewritten part of the background data.

16. A method of processing a video game by causing an image display apparatus to display a player character on an image display screen of the image display apparatus, the method controlling a progress of a video game by controlling an action of the player character to be displayed on the image display screen in accordance with operations by a player, the method comprising:
searching for other video game processing apparatuses, which are other parties within a communication range of the video game processing apparatus of the player;
establishing, when a found video game processing apparatus of the other video game processing apparatuses is found, a wireless one-to-one communication link to the found video game processing apparatus automatically;
receiving game information from the found video game processing apparatus by close-range radio communication, the game information including conditional read data, unconditional read data, and conversion execution data, the conditional read data being unreadable until a specific condition is met, the unconditional read data being readable unconditionally, the conversion execution data being for rewriting an arbitrary part of a game program of the video game stored by the video game processing apparatus of the player that receives the game information;
rewriting, as a trigger when the game information is acquired by the video game processing apparatus of the player, data at the arbitrary part of the game program in accordance with the conversion execution data included in the game information;
determining whether the specific condition is met during the progress of the video game, the specific condition being determined as being met when a predetermined processing is carried out for the arbitrary part of the game program at which the data are rewritten by the rewriter; and changing the game information so that the conditional read data becomes readable for the player when the condition determiner determines that the specific condition is met.

17. A non-transitory computer readable medium that stores a program for processing a video game, a progress of the video game being controlled by causing an image display apparatus to display a player character of the video game on an image display screen of the image display apparatus, and controlling an action of the player character displayed on the image display screen in accordance with operations by a player, the non-transitory computer readable medium causing a computer to:

search for other video game processing apparatuses, which are other parties present within a communication range of the video game processing apparatus of the player;

establish, when a found video game processing apparatus of the other video game processing apparatuses is found, a wireless one-to-one communication link to the found video game processing apparatus automatically;

receive game information from the found video game processing apparatus by close-range radio communication, the game information including conditional read data, unconditional read data, and conversion execution data, the conditional read data being unreadable until a specific condition is met, the unconditional read data being readable unconditionally, the conversion execution data being for rewriting an arbitrary part of a game program of the video game stored by the video game processing apparatus of the player that receives the game information;

rewrite, as a trigger when the game information is acquired by the video game processing apparatus of the player, data at the arbitrary part of the game program in accordance with the conversion execution data included in the game information;

determine whether the specific condition is met during the progress of the video game, the specific condition being determined as being met when a predetermined processing is carried out for the arbitrary part of the game program at which the data are rewritten by the rewriter; and change the game information so that the conditional read data becomes readable for the player when it is determined that the specific condition is met.

* * * * *

UNITED STATES PATENT AND TRADEMARK OFFICE
CERTIFICATE OF CORRECTION

PATENT NO. : 8,251,823 B2
APPLICATION NO. : 11/947367
DATED : August 28, 2012
INVENTOR(S) : Tatsuya Kando et al.

It is certified that error appears in the above-identified patent and that said Letters Patent is hereby corrected as shown below:

Title page 2; (56) References Cited; U.S. Patent Documents, column 1, line 13, please change "2004/0029638 A1*  2/2004  Hytcheson et al." to --2004/0029638 A1*  2/2004  Hutcheson et al.--.

Signed and Sealed this
Twenty-sixth Day of February, 2013

Teresa Stanek Rea
*Acting Director of the United States Patent and Trademark Office*